(12) United States Patent
Turner et al.

(10) Patent No.: US 10,360,221 B2
(45) Date of Patent: Jul. 23, 2019

(54) METHOD, SYSTEM, AND CLIENT FOR CONTENT MANAGEMENT

(71) Applicant: Sony Corporation, Minato-ku (JP)

(72) Inventors: Alan Hogg Turner, Basingstoke (GB); Jonathan Richard Thorpe, Winchester (GB); Thomas Hugh Pierce, Fleet (GB)

(73) Assignee: Sony Corporation, Tokyo (JP)

( * ) Notice: Subject to any disclaimer, the term of this patent is extended or adjusted under 35 U.S.C. 154(b) by 676 days.

(21) Appl. No.: 14/600,348

(22) Filed: Jan. 20, 2015

(65) Prior Publication Data

US 2015/0286644 A1 Oct. 8, 2015

(30) Foreign Application Priority Data

Apr. 3, 2014 (GB) ..................................... 1406023

(51) Int. Cl.
*G06F 17/30* (2006.01)
*G06F 16/2457* (2019.01)
*G06F 16/248* (2019.01)
*G11B 27/28* (2006.01)
*G11B 27/34* (2006.01)
(Continued)

(52) U.S. Cl.
CPC ...... *G06F 16/24578* (2019.01); *G06F 16/248* (2019.01); *G06F 16/738* (2019.01); *G06F 16/784* (2019.01); *G11B 27/28* (2013.01); *G11B 27/34* (2013.01)

(58) Field of Classification Search
None
See application file for complete search history.

(56) References Cited

U.S. PATENT DOCUMENTS 8,849,432 B2 * 9/2014 Moorer .............. H04N 21/4223
700/94
9,576,033 B2 * 2/2017 Barrett .............. G06F 17/30038
(Continued)

OTHER PUBLICATIONS

Office Action dated Feb. 5, 2018 in Chinese Application No. 201510154981X (English translation only).

*Primary Examiner* — Alex Gofman
(74) *Attorney, Agent, or Firm* — Oblon, McClelland, Maier & Neustadt, L.L.P.

(57) ABSTRACT

A method of producing the results of a search for content for display on a client is described. The method comprises: identifying a plurality of objects of interest; uploading an image of each of the plurality of objects to a server; uploading captured content to the server, the captured content including the plurality of objects; performing, on the server, recognition of each of the objects in the captured content; generating a confidence score indicating the probability of each of the recognized objects being present in the content; receiving, from the client, an object selection, wherein the results of the search are arranged on the basis of the selected object; and generating the results of the search on the server for downloading to the client for display on the client, wherein a representation of the captured content is located between a representation of the selected object and another of the plurality of objects, the distance between the representation of the captured content and the plurality of objects being determined in accordance with the confidence score.

21 Claims, 15 Drawing Sheets

(51) Int. Cl.
*G06F 16/783* (2019.01)
*G06F 16/738* (2019.01)

(56) References Cited

U.S. PATENT DOCUMENTS

| | | | | |
|---|---|---|---|---|
| 2008/0304807 | A1* | 12/2008 | Johnson | G06F 17/30787 386/278 |
| 2009/0265334 | A1* | 10/2009 | Narayanan | G06F 17/30265 |
| 2009/0292549 | A1 | 11/2009 | Ma et al. | |
| 2014/0331187 | A1* | 11/2014 | Hicks | G06F 3/0488 715/845 |
| 2015/0095352 | A1* | 4/2015 | Lacey | G06F 17/30011 707/752 |

* cited by examiner

METHOD, SYSTEM, AND CLIENT FOR CONTENT MANAGEMENT

CROSS REFERENCE TO RELATED APPLICATIONS

The present application claims priority to United Kingdom Application GB1406023.0 filed on 3 Apr. 2014, the contents of which being incorporated herein by reference in its entirety

BACKGROUND

Field of the Disclosure

The present disclosure relates to a method, system, server and client for content management.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

During shooting of a movie or a television production, many members of crew are used to monitor the production. For example, members of crew spend time monitoring certain good shots, or changes in scene. A member of crew has to write (either electronically or using pen and paper) time codes, scene numbers and the like. This is time consuming.

It is an aim of the present disclosure to alleviate this problem.

SUMMARY

According to the disclosure there is provided a method of producing the results of a search for content for display on a client comprising: identifying a plurality of objects of interest; uploading an image of each of the plurality of objects to a server; uploading captured content to the server, the captured content including the plurality of objects; performing, on the server, recognition of each of the objects in the captured content; generating a confidence score indicating the probability of each of the recognised objects being present in the content; receiving, from the client, an object selection, wherein the results of the search are arranged on the basis of the selected object; and generating the results of the search on the server for downloading to the client for display on the client, wherein a representation of the captured content is located between a representation of the selected object and another of the plurality of objects, the distance between the representation of the captured content and the plurality of objects being determined in accordance with the confidence score.

This allows a user to view content that is relevant to one another very quickly as the content is located very close to one another on a screen.

The position of the selected object may be substantially at the centre of the screen of the client.

The captured content may include a plurality of takes of the content, and the method comprises: indicating in the representation of the captured content, the number of takes.

The indication of the number of takes may comprise providing a representation of each take in an overlapping manner.

The distance between the representation of the captured content and the representation of the plurality of objects may be inversely proportional to the confidence score.

The method may further comprise providing metadata indicating the focal length of the camera capturing the content and determining the category of the captured content in dependence of the metadata.

The object selection on the tablet may comprise: receiving a long-press from a user highlighting one of the plurality of objects; receiving a dragging operation from the user, dragging said highlighted object; and receiving a release operation from the user over a second one of the plurality of objects, wherein the object selection comprises selecting content including both the highlighted object and the second one of the plurality of objects.

A computer program containing computer readable instructions, which, when loaded onto a computer, configure the computer to perform a method according to any one of the above is envisaged.

A computer program product configured to store a computer program according to the above is also envisaged.

Also envisaged is a system for producing the results of a search for content, the system comprising a server and a client, wherein the client comprises a user input operable to identify a plurality of objects of interest displayed on the client; a communications unit operable to upload an image of each of the plurality of objects to the server, and the server comprises a server communications unit operable to receive captured content, the captured content including the plurality of objects, a processing unit operable to recognise each of the objects in the captured content and to generate a confidence score indicating the probability of each of the recognised objects being present in the content, wherein the server communication unit is operable to receive, from the client, an object selection, wherein the results of the search are arranged on the basis of the selected object; and the processing unit is operable to generate the results of the search for downloading to the client for display on a display of the client, wherein a representation of the captured content is located between a representation of the selected object and another of the plurality of objects, the distance between the representation of the captured content and the plurality of objects being determined in accordance with the confidence score.

Also envisaged is a server for producing the results of a search for content, the server comprising a server and a client, wherein the client comprises a user input operable to identify a plurality of objects of interest displayed on the client; a communications unit operable to upload an image of each of the plurality of objects to the server, and the server comprises a server communications unit operable to receive a plurality of objects of interest to a user of a client, and to receive an image of each of the plurality of the objects and captured content, the captured content including the plurality of objects, a processing unit operable to recognise each of the objects in the captured content and to generate a confidence score indicating the probability of each of the recognised objects being present in the content, wherein the server communication unit is operable to receive, from the client, an object selection, wherein the results of the search are arranged on the basis of the selected object; and the processing unit is operable to generate the results of the search for downloading to the client for display on a display of the client, wherein a representation of the captured content is located between a representation of the selected object and another of the plurality of objects, the distance between the representation of the captured content and the plurality of objects being determined in accordance with the confidence score.

Also envisaged is a client for displaying the results of a search for content, the client comprising a user input operable to identify a plurality of objects of interest displayed on the client; a communications unit operable to upload an image of each of the plurality of objects to a server, and the communications unit is operable to send to the server, an object selection and to receive from the server, for display, the results of the search, wherein a representation of captured content is located between a representation of the selected object and another of the plurality of objects, and the distance between the representation of the captured content and the plurality of objects is determined in accordance with a confidence score that indicates the probability of each of the recognised objects being present in the content.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
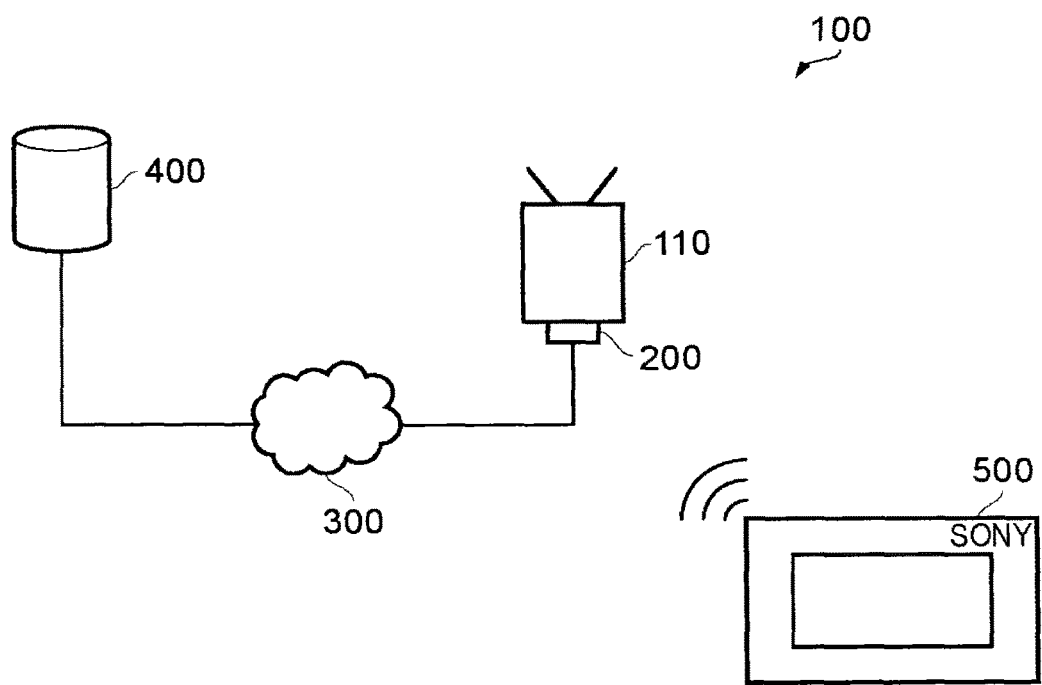
FIG. 1 shows a system according to embodiments.

Referring now to the drawings, wherein like reference numerals designate identical or corresponding parts throughout the several views.

Referring to FIG. 1, a system 100 according to embodiments is shown. In the system 100, a camera 110 is attached to a wireless adapter 200. The camera 110 may be a professional video camera capturing High Definition or 4K or 8K images for example. Alternatively, the video camera 110 may be a video camera used by an amateur videographer. As further alternatives, the camera 110 may be a camera that captures still images.

The wireless adapter 200 is connected to the camera 110. Although the wireless adapter 200 is shown as a separate box to the camera 110, the disclosure is in no way limited to this and the wireless adapter 200 may be integrated with the camera 110. The functionality of the wireless adapter 200 is described in FIG. 2.

The wireless adapter 200 is connected to a Wide Area Network 300. The Internet is one example of the Wide Area Network 300. The wireless adapter 200 may be connected to the Wireless Area Network using a cellular network such as 3G or Long Term Evolution (LTE). Alternatively, the wireless adapter 200 may be connected to a Local Area Network which, itself, has access to the Internet 300.

A server 400 is connected to the Wide Area Network 300. The server 400 is described with reference to FIG. 3. The server 400 stores content captured by the camera 110. This content may be high quality captured image or may be lower quality images. The server 400 has software stored thereon which processes the captured images and metadata as will be explained later.

The server 400 returns the video content and processed metadata to a computer. In embodiments, the computer is a tablet computer 500 such as a Sony Xperia Tablet Z2. However, any other computer is envisaged. The server 400 provides the processed video content and metadata to the tablet computer 500. The server 400 provides the video content and the processed metadata to the tablet computer 500 via the Wide Area Network 300 and the Local Area Network.

Figure 2:
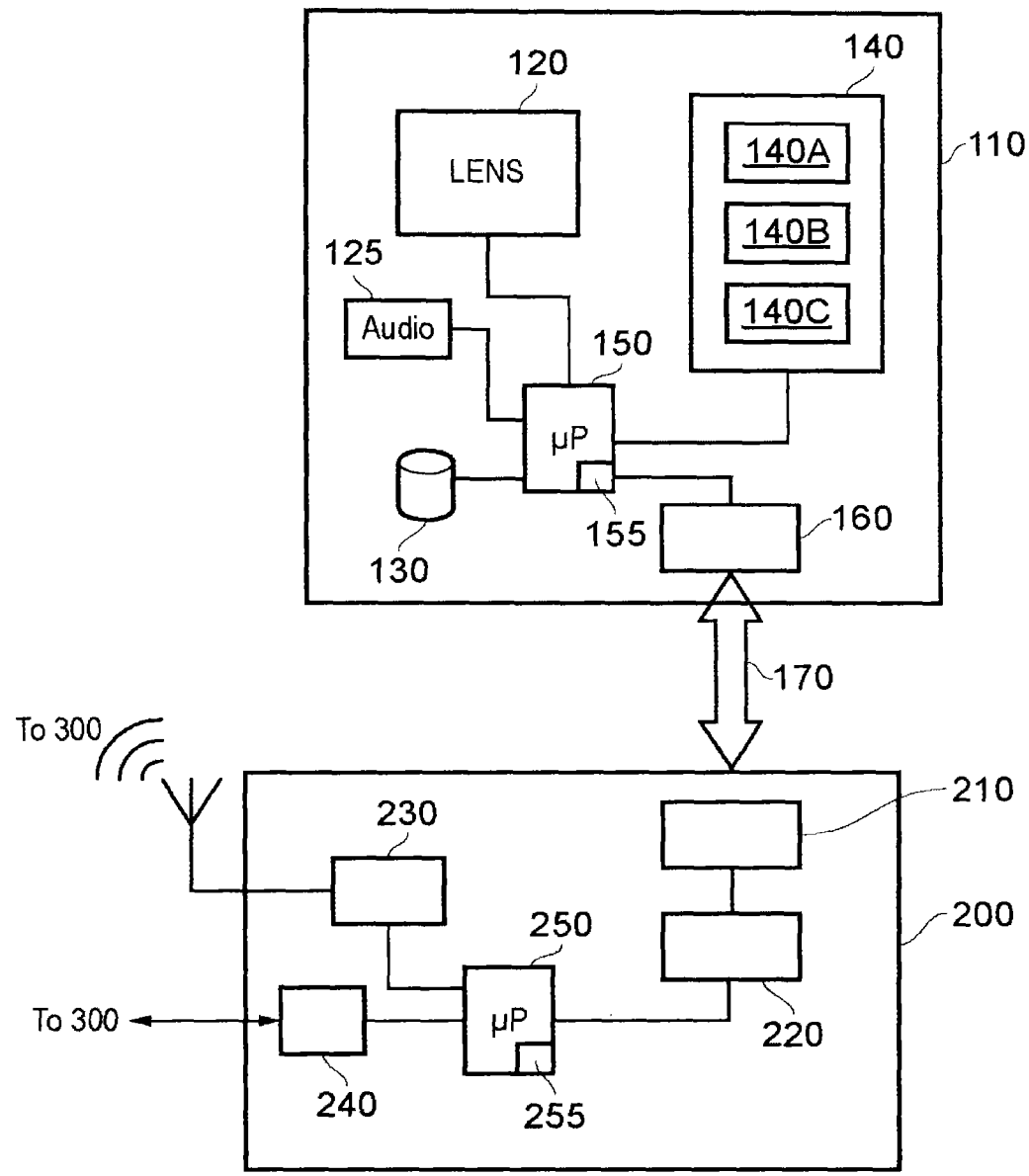
FIG. 2 shows a camera and wireless adapter used in the system of FIG. 1.

Referring to FIG. 2, the camera 110 is shown connected to the wireless adapter 200. In embodiments, the wireless adapter 200 is a CBK-WA100 wireless adapter produced by Sony Corporation®, although the disclosure is in no way limited to this. Further, one example of the camera 110 to which the wireless adapter 200 is connected is an PMW-300 produced by Sony Corporation®.

The camera 110 comprises a lens 120. The lens 120 is used to capture the image within the production. The captured images are stored in camera memory 130. The images are captured using at a high resolution. The high resolution may be so-called High Definition, or HD images having a resolution of 1920×1080 pixels or the like. Further, the high resolution images may be so-called 4K or even 8K images. The aperture of the lens 120, the focal length of the lens 120 and other metadata indicating the state and settings of the lens 120 are recorded and stored in association with the captured image in the memory 130.

The operation of the camera 110 is controlled by camera controller 150. In embodiments, camera controller 150 is a microprocessor that is operated using software code. The software code is stored, in embodiments, within camera controller memory 155. Camera controller memory 155 is solid state storage. The camera controller 150 is also connected to the memory 130.

The camera 110 also includes an audio processor 125. The audio processor 125 is connected to a microphone (not shown). The microphone captures sound and passes the audio to the audio processor 125 which converts the sound into audio data. The audio data is fed to the memory 130 via the camera controller 150. The audio data is stored within the memory 130 in association with the captured images.

Additionally, metadata sensors 140 are provided in the camera 110. The metadata sensors 140 capture so-called "metadata". Typical metadata captured by the metadata sensors 140 include good-shot markers, positional information (i.e. Global Positioning by Satellite (GPS)) data describing the co-ordinates of the position of the camera 110, time-codes of the image, lens metadata such as aperture setting and zoom length of the lens, camera operator and the like. These pieces of metadata are derived by the good-shot marker sensor 140A, the GPS sensor 140B and time-code generator 140C. Of course, other metadata could be captured in addition to or instead of that described above. The metadata sensor 140 is connected to the camera controller 150.

The camera controller 150 is also connected to an external connector 160. The external connector 160 connects to the wireless adapter 200. The external connector 160 allows the camera controller 150 to communicate with the wireless adapter 200. In embodiments, the wireless adapter 200 and the external connector 160 communicate using both the HD-SDI standard and the USB Standard. The HD-SDI standard communicates video, audio time code, record start and stop and essence metadata mark. The USB standard is used to communicate camera metadata, camera control and file based transfer of media and metadata. The USB protocol used is proprietary to Sony Corporation® in this case. This line of communication is represented by arrow 170 in FIG. 2. The captured images, corresponding audio and recorded metadata which is stored in memory 130 is communicated over the line of communication 170.

In particular, the external connector 160 within the camera 110 communicates with an external connector 210 within the wireless adapter 200. The external connector 210 within the wireless adapter 200 will hereinafter be referred to as "the adapter external connector". The adapter external connector 210 communicates with the external connector 160 using the HD-SDI and USB standards as explained above.

The adapter external connector 210 is connected to a down sample unit 220 within the wireless adapter 200. The down sample unit 210 receives captured image data from the camera 110 (which is stored within memory 130) and produces a lower quality representation of the captured image data. This lower quality representation may be produced by down sampling the image or by encoding the image in a particular way. The point to note, however, is that the output of the down sample unit 220 is a lower quality representation of the captured image data stored in memory 130. Further, the down sample unit 220 may also receive the captured audio data from the camera 100 and provide a lower quality representation of the audio.

The wireless adapter 200 includes adapter controller 250. In embodiments, wireless adapter controller 250 is a microprocessor that is operated using software code. The software code is stored, in embodiments, within wireless adapter controller memory 255. Wireless adapter controller memory 255 is solid state storage.

Wireless adapter controller 250 is connected to a wireless interface 230 and a wired interface 240. The wireless interface 230 is operable to communicate the output of the down sample unit 220 (which is the image and/or audio data at a lower quality than that captured by the camera 110) and the metadata captured by the metadata sensor 140 within the camera 110 over a network. In this case, the wireless interface 230 may communicate the data over a cellular network (such as a 3G or Long Term Evolution, LTE, network), a satellite or over a Wi-Fi local network for connection over the Internet 300. Similarly, the adapter 200 may communicate this data over the Internet 300 using a wired connection. As the skilled person will appreciate, by providing the down sample unit 220, the bandwidth used in communicating the image and/or audio content is reduced. This increases the speed at which the content can be provided for a given bandwidth and reduces the amount of data traffic on the network.

Of course, the down sample unit 220 is not necessary and the captured image and/or audio data may be transferred without reducing the quality of the content.

Figure 3:
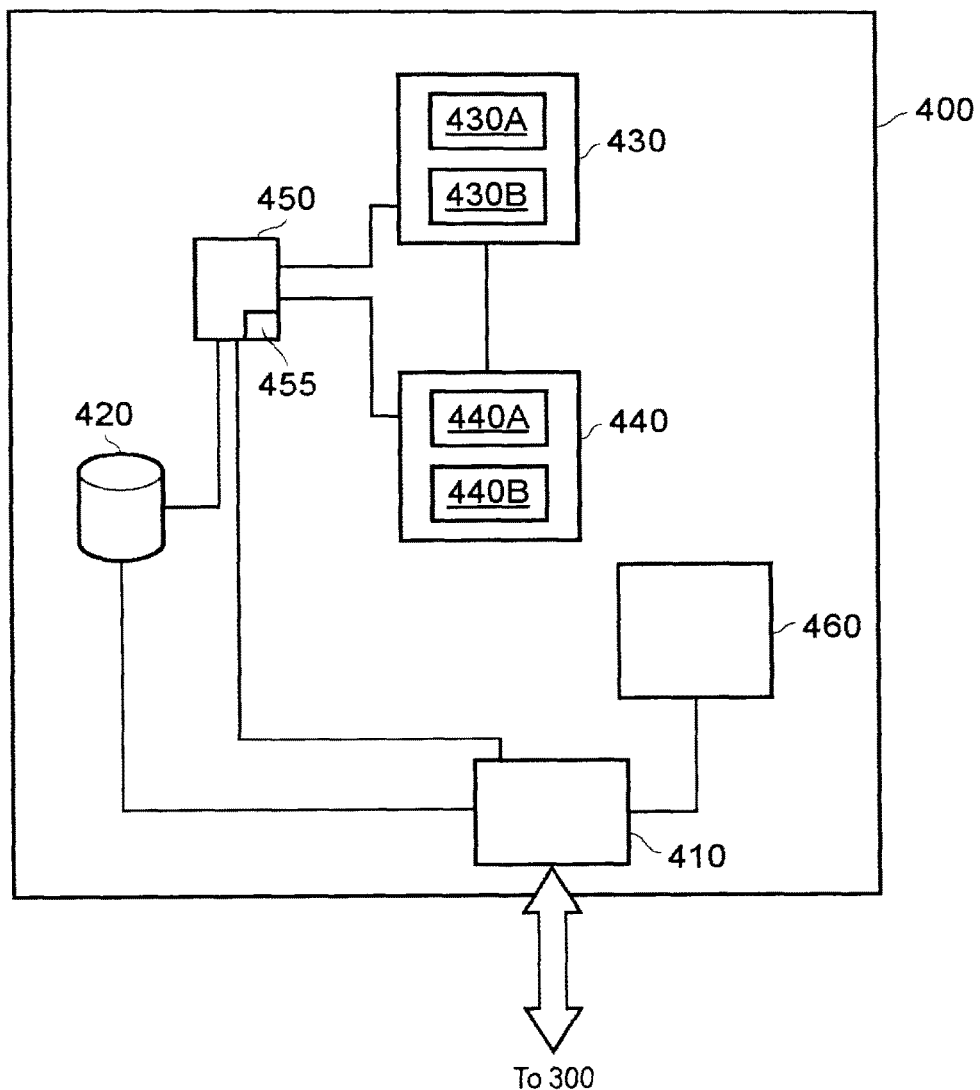
FIG. 3 shows a server used in the system of FIG. 1.

Referring to FIG. 3, a server 400 according to embodiments is shown. The server 400 receives the image and/or audio content and the metadata from the wireless adapter 200 via the Internet 300. The content and metadata is received by a server adapter 410 which connects the server 400 to the Internet 300. The server adapter 410 is connected to server storage 420 which stores the received content and metadata, and associates the received content and metadata to a particular user as will be explained later.

The operation of the server 400 is controlled by a server controller 450. In embodiments, server controller 450 is a microprocessor that is operated using software code. The software code is stored, in embodiments, within server controller memory 455. Server controller memory 455 is solid state storage. The server controller 450 is also connected to the server storage 420.

The server controller 450 is connected to metadata extractor 430 and metadata processor 440. Metadata extractor 430 and metadata processor 440 are also connected to each other. Additionally provided in the server 400 is an interface generator 460.

The metadata extractor 430 includes blocks that extract metadata from the content provided by the wireless adapter 200. Specifically, the metadata extractor 430 extracts semantic metadata that describes the content of the image and/or audio data. In embodiments, the metadata extractor 430 includes a speech recognition block 430A that recognises the speech with the audio content and transcribes the recognised speech and stores the transcribed speech along with the image and/or audio content. Also, the metadata extractor 430 includes a face recognition block 430B that identifies faces within the captured images and stores the identified faces along with the image and/or audio content. Other metadata extraction blocks may be alternatively or additionally provided. For example, a slate recognition block may be provided that automatically identifies from the audio and/or image content the presence of a slate or so called "clapper board" which is used to distinguish between scenes or takes within a scene. Further, number and character recognition may be provided that automatically generates metadata identifying the scene or take number from the slate. Other metadata extraction blocks such as focus detection and shot classification may be provided as would be appreciated.

The metadata processor 440 includes a camera setting block 440A and a planning block 440B. The camera setting block 440A extracts the metadata produced by the metadata sensor 140 within the camera 110. This will be explained later. The planning block 440B receives, via the Internet 300, planning notes associated with the production. These planning notes may include a shooting schedule, a script and the like. The planning notes are provided in advance of the capturing of the images and/or audio. In other words, the planning notes are uploaded to the server 400 and stored within the server storage 420 in advance of the image and audio capture. The planning notes are associated with a particular production and/or a particular user of the server 400. The planning notes are a form of metadata.

The interface generator 460 produces a graphical user interface that is provided to the tablet 500. The graphical user interface is produced from the metadata extracted from the camera 110 and the metadata extracted from the content stored on the server storage 420 by the metadata extractor 430. The interface generator 460 is therefore connected to both the metadata processor 440 and the server adapter 410. The operation of the interface generator 460 will be described later.

Figure 4:
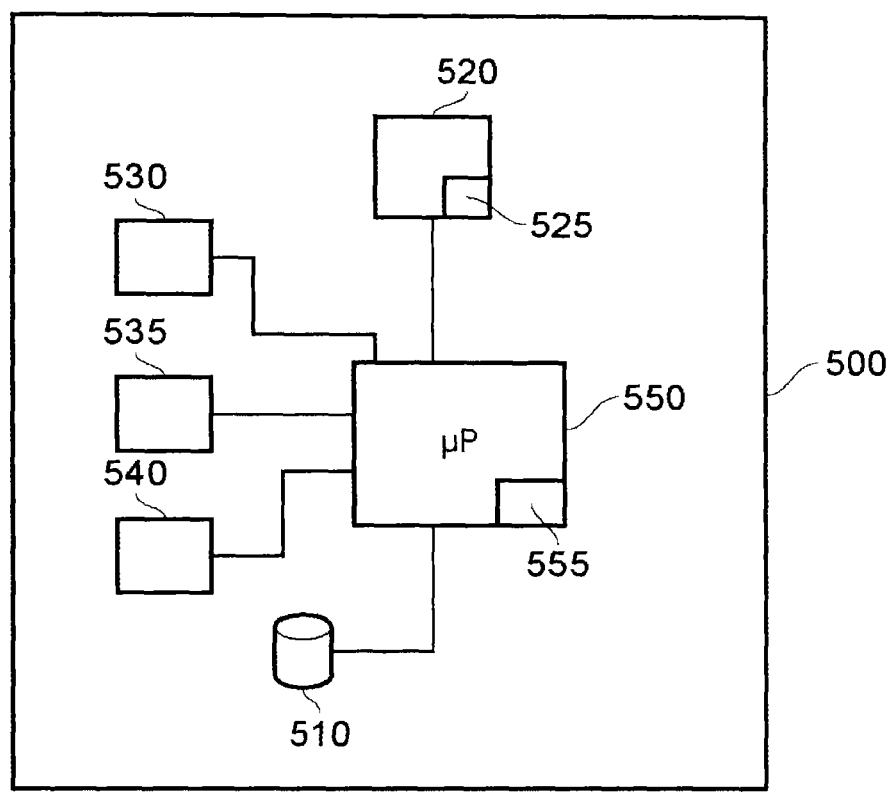
FIG. 4 shows a tablet used in the system of FIG. 1.

Referring to FIG. 4, the tablet computer 500 according to embodiments is described. Of course, as noted above, although the following describes a tablet computer, any kind of computer, smartphone or personal digital assistant could equally be used. Indeed any client may be used.

The tablet computer 500 includes a tablet controller 550. The operation of the tablet computer 500 is controlled by tablet controller 550. In embodiments, tablet controller 550 is a microprocessor that is operated using software code. The software code is stored, in embodiments, within tablet controller memory 555. Tablet controller memory 555 is solid state storage. The tablet controller 550 is connected to tablet memory 510 which is used to store video and/or audio content, other computer applications ("apps") or the like.

The user operates the tablet computer 500 using a touch screen interface. The touch screen 525 is, in embodiments a capacitive type touch screen that can be operated using a finger or stylus or the like. The touch screen 525 is provided on display 520. The concept of a touch screen interface is known and so will not be described any further.

Also connected to the tablet controller 550 is an audio/video processor 530, a Wi-Fi adapter 535 and a global positioning device (hereinafter "GPS device") 540. The audio/video processor 530 processes the audio data and the video data to be provided to the user of the tablet computer 500. The WIFI adapter 535 connects the tablet computer 500 to a local area network. The Wi-Fi adapter 535 is used by the tablet computer 500 to receive data from and provide data to the server 400 as will be explained later. The GPS device 540 provides specific location information identifying the exact location of the tablet computer 500.

The operation of the system is broken down into two distinct stages. The first stage is set up of the system and the second stage is generating the assisted logging information.

Set-Up

Figure 5:
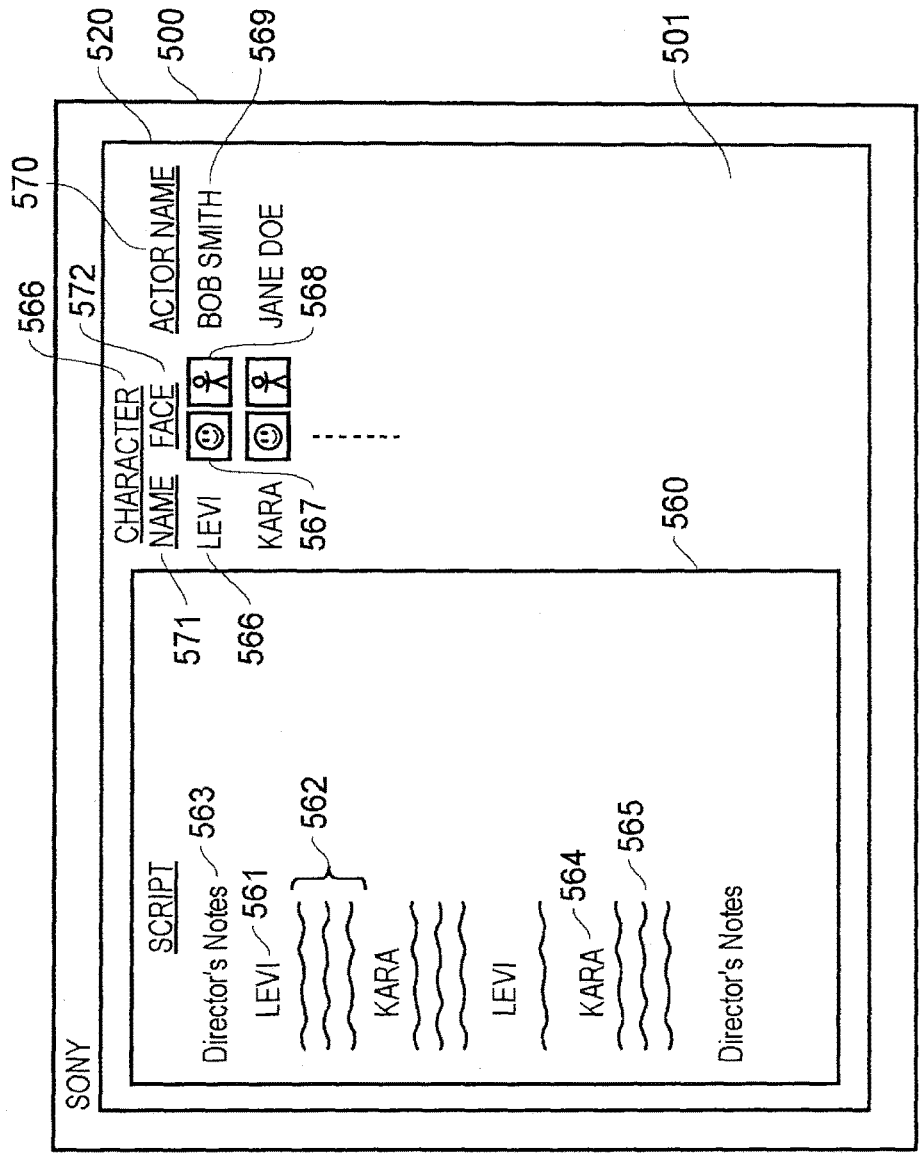
FIG. 5 shows a tablet having a training screen loaded thereon.

FIG. 5 shows a training page 501 displayed on the tablet 500 during part of the training phase. The user interacts with the tablet 500 using the touch screen 520.

Prior to the training page 501 being displayed, the user must authenticate themselves with the tablet 500. This, in embodiments, requires the user to enter a username and password. Once authenticated with the tablet 500, the user must authenticate with the server 400. Again, this requires entering a unique username and password. Upon correct authentication, the server 400 allows the user to choose which production he or she wishes to access. In other words, the server 400 stores a database on the storage device 420, the database associating one production with one or more users. It is possible that different users have different levels of access to any one production. For example, a director may be able to access any part of the database associated with that production, whereas a film loader may only have restricted access to the database.

After authentication with the server 400, the server 400 instructs the tablet 500 to run the training page 501. The training page 501 may be pushed from the server 400 to the tablet 500 or may be a computer application ("an app") stored on the tablet 500 which is instructed to start by the server 400. The training page On the training page 501 is a copy of the script 560 which will be used in the production. The script 560 includes director's notes 563, characters' names 561, 564 and dialogue 562, 565. This script 560 may have been written on word processing software such as Word® developed by Microsoft Corp.® Alternatively, the script 560 may have been developed using a script writing package such as FinalDraft (by FinalDraft Inc) or Adobe Story. Alternatively, the script 560 may be a captured image of the script such as a scanned PDF document. In this instance, it is necessary to perform Optical Character Recognition (OCR) on the image so that one or more words within the script may be recognised by the tablet 500 and/or server 400 as will be explained. It is important to note here that the script 560 is written in a particular format. Specifically, the director's note for a scene is located above the dialogue and that the dialogue is written under a particular character name indicating which character is speaking at any particular time. Although the specific format is not particularly relevant, it is important that the format of the script 560 is consistent throughout as will be explained later.

Additionally provided is a list of characters 566 in the script 560. The list of characters 566 includes the name of the character 571, a face-shot of the character 572 and the name of the actor 570. This information is populated by the user of the tablet 500. For example, during the training phase, the user may highlight the name of the character in the script by having a long-press on the character's name. This will automatically populate the character's name in the "name" column 571. In this case, the user of the tablet 500 provides a long press on the name "Levi" 561 located on the script 560. A new name "Levi" 566 then appears in the character list 571.

The user of the tablet 500 then highlights the name "Levi" 566 and the tablet 500 requests one or more representative photographs of the character Levi. In this case, the tablet 500 requests two photographs be provided; one face shot 567 and one full length shot 568. In other embodiments, of course, the user may select the photograph and simply drag the photograph underneath the "face" column. The tablet 500 will then associate the photograph with the relevant character's name and display a thumbnail representation of the image. In this embodiment, the tablet 500 requests that the user provide a face shot 567 and a full length shot 568 of the character. As will be explained later, the face shot 567 and the full length shot 568 will be used to recognise the character in captured images. Therefore, it is desirable to provide at least two different shots of the character to assist in locating the character in images.

Finally, the user of the tablet 500 will insert the name of the actor portraying the character. This is inserted in the "actor name" column 570. In this example, the actor's name is "Bob Smith". Although the user may type the actor's name into the column, it is possible that if the script has a cast list, then the actor's name may be automatically retrieved from the cast. For example, the script 560 may include a certain area or set of symbols within the script 560 that identifies where the cast list is located. The information identifying the cast list may then be automatically retrieved from this area and will populate the "actor name" column 570.

After the script 560 and the character list 566 have been completed on the tablet 500, the tablet 500 sends the completed information to the server 400 via the Internet 300.

The script 560 and the character list 566 are received by the server adapter 410 and are stored in association with the particular user of the tablet 500 and the particular production, on the server storage 420.

In addition to the script 560, a shooting schedule is created on the tablet 500 and is uploaded to the server 400 for storage thereon. The shooting schedule is stored in association with the user and the production. The shooting schedule is a term of art and includes the camera settings required for a particular scene (such as frame rate, shutter speed, lens type) and planning data for the scene (such as shot categories, frame markers). The script 560 and the character list 566 will be used by the server 400 to produce a logging assistant which will be provided on the tablet 500 as will be explained later.

Generating the Logging Assistant

During capture of the production, the camera 110 is used. As noted previously, camera 110 is connected to wireless adapter 200. Before shooting a scene, the camera operator sets up the camera. During this set-up, the camera operator configures the wireless adapter 200 to communicate with the server 400. Specifically, the camera operator configures the wireless adapter 200 to log the down-converted images with a particular production. In order to do this, the wireless adapter 200 will need to authenticate with the server 400. This authentication is provided by the camera operator entering a username and password that is unique to the camera operator. The camera operator can then select a current production he or she is working on.

The down-converted video and the audio captured by camera 110 is received at the server 400 and stored on server storage 420. Additionally stored on the server 400 is the metadata recorded by the metadata sensor 120. This metadata relates to parameters of the camera 110 set when the video and audio is captured.

After storage on server storage 420, the video and audio is transferred to the metadata extractor 430. The audio and video is analysed by metadata extractor 430 and additional metadata relating to the actual content of the audio and/or video is extracted. This metadata is sometimes called "semantic metadata".

The process of metadata extraction will now be described.

Firstly, the video is processed and person recognition processing is carried out on the video. During this person recognition process, people and/or faces of people are identified within the images and compared with those images of the characters uploaded from the tablet 500 during the set-up phase. In other words, the people and/or faces identified in the images are compared with the images provided in the column "Faces" 572 in FIG. 5. It will be apparent that it is useful to provide the server 400 with a face shot and a full-length shot to ensure that the likelihood of identifying the presence of a particular character, irrespective of focal length of the camera, is high.

Further, as the name of the actor playing a particular character is provided, the server 400 performs a web-search using the actor's name and returns images of the actor. These may be as still images or as moving images with audio. In this case, the "face" column 572 is updated with these returned images. This improves the accuracy of the face recognition.

In addition, the person recognition will count the number of people present in the image. This will help identify the type of shot as will be explained later.

In order to improve the likelihood of identifying the presence of a particular character in a scene, the audio captured with the video is analysed. In particular, speech recognition is applied to the captured audio and that speech recognition returns a written version of the dialogue within the scene. This written version is compared with the candidate portions of the script 560 uploaded to the server 400. This comparison is made using a modified Levenstein algorithm. The output of the Levenstein algorithm is a distance metric. The distance metric indicates how close the written version of the dialogue is to the candidate portions of the script 560. The closer the distance, the more likely the candidate portion of the script 560 matches the written version of the dialogue. Clearly, it is possible that the further the distance the more likely the candidate portion of the script matches the written version of the dialogue.

From this comparison, it is possible to identify where in the script 560 the scene is located and thus which characters are in the captured scene. Indeed, it is acknowledged that speech recognition within a production environment is not always accurate due to noise in the scene, slurred speech etc. Therefore, by only recognising a few words in any piece of dialogue, as the script 560 provides a known text, it is possible to identify the location of the scene, and thus the characters located within the scene, with great accuracy even if a large number of spoken words are not identified. For example, if the script 560 includes a piece of dialogue having the phrase "You've got to ask yourself one question: 'Do I feel lucky?' Well, do ya, punk?", and if the speech recognition process recognises "XXX got to ask yourself one question: 'XXX XXX XXX XXX?' Well, do XXX, XXX?" (where XXX indicates audible but unrecognised words), by reviewing the script 560, the captured dialogue can be correctly identified.

The metadata extractor 430 then creates an index of spoken words from the script 560 and locks each word to a particular timecode. The metadata extractor 430 then passes the index of spoken words, and the respective timecode to the metadata processor 440 as will be explained later.

Further, the metadata extractor 430 uses face recognition and the dialogue from the script to detect the characters present in any one frame. A confidence score is then generated that indicates the likelihood of a particular character or particular characters being present in a particular frame of video. This confidence score is generated using known techniques such as the confidence score in OpenCV's FaceRecognizer software. The recognised character (or characters), confidence score and timecode is forwarded to the metadata processor 440.

Further, the metadata extractor 430 identifies the presence of a slate (or clapperboard) in the scene. This is achieved by searching the audio of the clip to identify the distinctive sound of a "clap". Additionally, or alternatively, the video of the clip may be analysed to identify the presence of the slate in the video. Once the slate has been identified, the frame including the slate is analysed and the digits written on the slate are recognised. These digits and the frame number are returned to the metadata processor.

Additionally, the video of each clip is analysed to determine the degree of focus on each frame. The method for detecting the degree of focus is known (for example, the MPES-3DQC1 algorithm may be used) and so will not be described in any more detail. However, the degree of focus and the frame number of each frame is also returned to the metadata processor.

As noted above, the metadata processor 440 receives the semantic metadata extracted from the captured audio/video. Further the metadata processor 440 receives the metadata captured by the metadata sensor 120 located in the camera 110.

The metadata processor 440 receives the semantic metadata set out above. In particular, the metadata processor 440 receives the dialogue captured from the audio and associated timecode, details of the character or characters present in each frame (along with an associated confidence score), and the time-code of the frame. Further, the time code of any frame having a slate is provided along with the recognised numbers from the slate. Further, the degree of focus and the frame number of each frame is provided.

Additionally, the metadata processor 440 receives the metadata captured by the metadata sensor 120 located in the camera 110. This metadata includes focal length of the lens for each frame, the frame rate, the shutter speed and the lens type. In fact, the metadata processor 440 receives at least the same metadata as located in the camera settings part of the shooting schedule.

Figure 6:
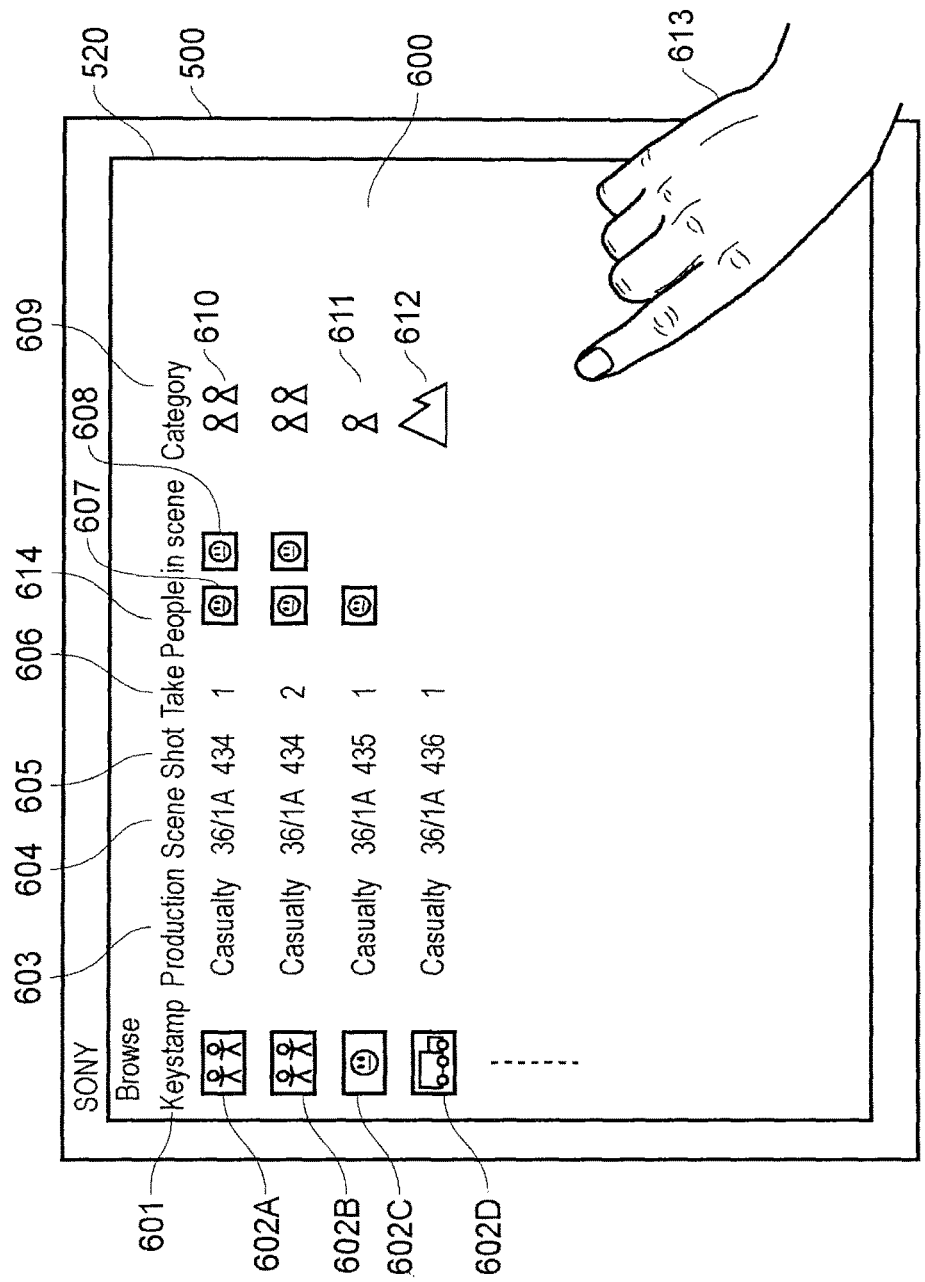
FIG. 6 shows a tablet having a logging assistant screen loaded thereon.

The metadata processor 440 uses this metadata to produce a logging assistant 600. The logging assistant is sent to the tablet 500 for display on the touch screen 520. One screen of the logging assistant is shown in FIG. 6. The logging assistant provides information generated by the metadata processor 440 in certain categories. In the example of FIG. 6, the logging assistant includes the categories keystamp 601, production 603, scene 604, shot 605, take 606, people in scene 614 and category 609.

In FIG. 6, there are described four different clips of video. For all of the four clips 602A-602D representative keystamp images are generated. The representative keystamp images are generated in a known method. The metadata processor 440, in embodiments, generates the representative keystamp and sends the frame number of the representative keystamp to the tablet 500. The tablet 500 then retrieves the frame from the camera 110 using the local area network. By operating in this manner, the amount of data being transferred over the internet is reduced. Alternatively, the metadata processor 440 may send the representative keystamp frame to the tablet 500.

The logging assistant 600 also provides a production column 603. This describes the production to which the logging assistant 600 relates. This information is retrieved from the tablet 500 as this information is required to authenticate the tablet 500 with the server 400. Of course, this information may also be retrieved from the server 400.

The logging assistant 600 also provides a scene column 604, shot column 605 and take column 606. The scene number, shot number and take number is provided on the slate at the beginning of the clip. This information is extracted by the metadata extractor 430 when the metadata extractor 430 identifies the digits on the slate during the production. This is explained above.

The logging assistant 600 also provides a "people in scene" column 614. This information is provided to the metadata processor 440 by the metadata extractor 430 as details of the character or characters in the scene. In particular, the metadata processor 440 receives the character or characters in the scene along with a confidence score of the likelihood of the character or characters actually being present in the clip. The metadata processor 440 then applies a threshold limit to determine which character or characters are located in the frame. For example, if the confidence score is equal to or greater than 65% likelihood of being present, then the metadata processor 440 indicates that the character is present. Alternatively, if the confidence score is less than 65% then the metadata processor 440 indicates the character as not being present. Obviously, the metadata processor 440 may select any confidence score as being the threshold value. Further the confidence score may also be the length of time that a particular character or characters are located in the clip. For example for a clip of 1000 frames, if a character appears for only 25 frames, then the confidence score will be very low indicating that the character is only present for a small amount of time and so the clip should not indicate the appearance of the character. Again there may be a threshold number of frames for which the character must appear to be counted as being present in the clip. This may be an absolute number (for example, a number of frames) or a proportion of frame (for example for 20% of the frames) or indeed may include a proportion of consecutive frames (for example the character must be in 5% of the clip in consecutive frames).

In addition or as an alternative, the head and/or face size could be used to determine the type of shot or the quality of the identification. Typically, small faces (i.e. faces which occupy a small proportion of the screen) are both less accurately detected and usually relate to less prominent characters. Therefore, a small head and/or face size could be used to indicate a lower confidence score.

The metadata processor 440 identifies the character or characters in the scene and either returns the face shot of each of the characters or returns an indication of each of the characters so that the tablet 500 populates the column with the face shot of each of the characters. In the case of clip 602A and 602B, two different characters are present indicated by face shot 607 and 608. However, in the case of clip 602C, only a single character is identified and in clip 602D no characters are recognised. In the case of clip 602D where no characters are recognised, there is no entry made for "people in the scene".

The metadata processor 440 also identifies the category of the clip. This is shown as category column 609. In particular, as seen in FIG. 6, as clips 602A and 602B each have two characters in the clip, an icon indicating a group of characters 610 is provided in the category of the clip. Again, as above, face size may be used to determine the category of shot. In the case of clip 602C, an icon indicating a single character 611 is provided in the category of the clip. In the case of clip 602D, an icon indicating a wide angle shot is provided in the category of the clip. This category is selected on the basis of no characters being present in the clip and on the basis of the focal length metadata supplied from the metadata sensor 140. In other words, the focal length metadata supplied from the metadata sensor 140 indicates that the focal length of the lens is long (or greater than a particular threshold length). From this, the metadata processor 440 identifies that the category of the clip is a wide angle shot. Similarly other categories may be determined from the combination of metadata from the camera 101 and semantic metadata extracted by the metadata extractor 130. For example, if the semantic metadata indicates the presence of one or more character in an image and the focal length of the lens is short, then the metadata processor 140 determines that the category of the clip is a close up shot of the character.

From the logging assistant homepage shown in FIG. 6, further logging assistant features may be opened.

Figure 7A:
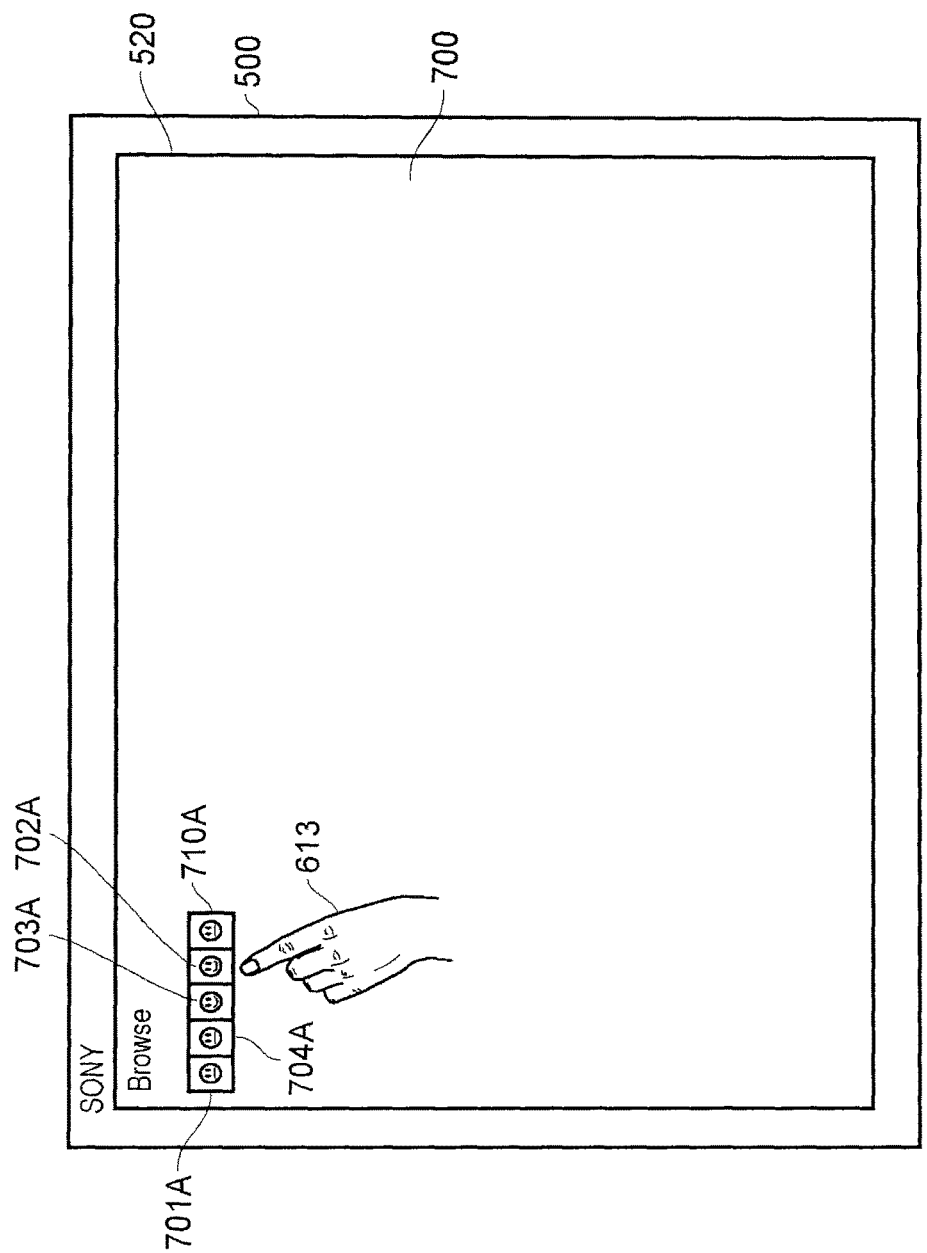
FIG. 7A shows a tablet having a character selection screen loaded thereon.

FIG. 7A shows a user 613 selecting the search criterion. The user 613 is presented with thumbnail images. Specifically thumbnail images 701A, 702A, 703A, 704A and 710A are located on the touch screen 520 of the tablet 500 and show all of the characters present in a particular production. The thumbnail images are representations of desired objects within the captured content. In this example, the thumbnail images are characters, but the disclosure is not so limited and may be other people, or other objects such as a particular car, or horse, cat or dog or the like. In this particular embodiment, the thumbnail images are located on the top left side of the screen. Of course, the thumbnail images may be located on other areas of the screen 520. The user then selects one of the thumbnail images 701A, 702A, 703A, 704A and 710A. In this case, the user will select thumbnail 702A.

The selected thumbnail image (or selected object) indicates the character around which the search results will be centred. In other words, although the thumbnail images are representations of desired objects, the positioning of the search results on the display of the tablet 500 will be centred around the selected thumbnail as will be explained with reference to FIG. 7B. The selected object is then communicated to the server 400. For example, an identifier that uniquely identifies the selected object is sent to the server 400. The server 400 then generates the search results on the basis of the selected object.

The server 400 passes the selected object to the metadata processor 440. The metadata processor 440 analyses the metadata indicating in which clips the selected character is present. The metadata processor 440 identifies the centre position of the screen of the tablet 500 and provides either a link to the thumbnail image 702B for the tablet 500 to retrieve, say over the Internet, or a copy of the thumbnail image. Additionally, the metadata processor 440 identifies all the captured clips in which the character in thumbnail 702B is present. The metadata processor 440 positions those clips around thumbnail 702B at a distance inversely proportional to the confidence score. The position of the clip as well as either the representative keystamp or a link to the representative keystamp is inserted in the map.

The metadata processor 440 then analyses the metadata associated with each of the positioned clips to identify other characters present in those clips. The metadata processor 440 then inserts a thumbnail image associated with each of those characters. Again, the distance between the thumbnail and the keystamp is inversely proportional to the confidence score. For each of those characters, clips containing those characters are identified and the representative keystamps are located at a distance that is inversely proportional to the confidence score away from the thumbnail image representing the character. This is explained in more detail with respect to FIG. 7B.

Figure 7B:
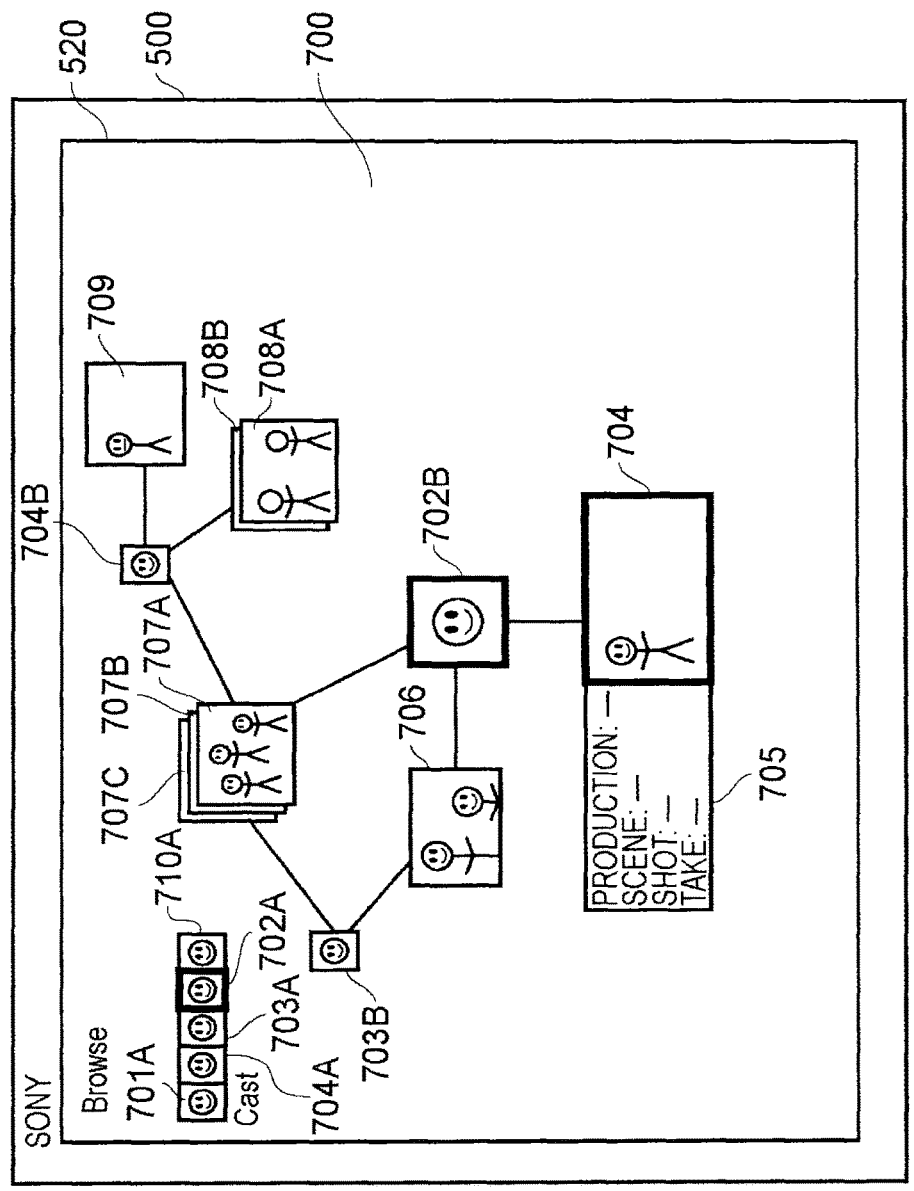
FIG. 7B shows a tablet having a search results map screen loaded thereon.

FIG. 7B shows a search screen 700 according to embodiments. The search screen returns the results of the search conducted on the server 400. As can be seen from FIG. 7B, thumbnail 702A is highlighted. This is achieved by applying a thick border around the thumbnail compared with the other thumbnail images. In order to further emphasise thumbnail 702A, in further examples, the other thumbnail images may be greyed out, or have greater transparency. Of course, other methods of highlighting thumbnails are envisaged.

In the centre of the touch screen 520 there is located thumbnail 702B. Thumbnail 702B contains the same image of the character in thumbnail 702A but thumbnail 702B is larger in size than thumbnail 702A. Further, a representative keystamp of a clip is shown in keystamp 704. The keystamp 704 is the same keystamp displayed in the keystamp column 601 of FIG. 6 and is connected to the thumbnail 702B. The keystamp 704 is a representation of the content of the clip. Adjacent the keystamp 704 is located metadata extracted from the production column 603, the scene column 604, the shot column 605 and the take column 606. In particular, the extracted metadata is located in metadata frame 705. It is advantageous to position the metadata frame adjacent the keystamp 704 for ease of reading for the user. Moreover, although the keystamp of the clip may be shown, in embodiments, when a user selects the keystamp 704, the clip associated with the keystamp 704 may begin play back.

Also provided on the search screen 700 is a second keystamp 706. The second keystamp 706 is connected to thumbnail 702B. Also connected to thumbnail 702B is a third keystamp 707A. The keystamp, second keystamp 706 and third keystamp 707A all contain the character identified in thumbnail 702B. It should be noted here that the keystamp 704, second keystamp 706 and third keystamp 707A are distanced from thumbnail 702B by different amounts. In fact, the distance by which each of the keystamp 704, second keystamp 706 and third keystamp 707A are separated from the thumbnail 702B is determined by the confidence score of the character in thumbnail 702B being located in each of the keystamp 704, second keystamp 706 and third keystamp 707A. Specifically, the distance between the thumbnail 702B and each of the keystamp 704, second keystamp 706 and third keystamp 707A is inversely proportional to the confidence score. So, the higher the likelihood of the character being located in each of the clips associated with keystamp 704, second keystamp 706 and third keystamp 707A, the closer the thumbnail 702B is located to the respective keystamp. This allows the user to very quickly establish in which clips of video the character in thumbnail 702B is located.

Further a second thumbnail 703B is displayed on search screen 700. Second thumbnail 703B is an image of a different character to that of thumbnail 702B but is the same character as displayed in 703B (albeit in a larger thumbnail). It is also shown that the second thumbnail 703B is connected to second keystamp 706. This means that the character located in second thumbnail 703B is also present in the clip associated with the second keystamp 706. As described above, the distance between the second thumbnail 703B and the second keystamp 706 is inversely proportional to the likelihood of the character shown in the second thumbnail 703B being located in the clip associated with the second keystamp 706. In this instance, the second keystamp 706 is located between the thumbnail 702B and the second thumbnail 703B. Further, the distance between the thumbnail 702B and the second thumbnail 703B is inversely proportional to the confidence score. This means that the user of the tablet 500 can very quickly establish the clips that include the characters represented by thumbnail 702B and second thumbnail 703B.

Similarly, second thumbnail 703B is connected to third keystamp 707A which indicates that the character located in the second thumbnail 703B is also located in the clip associated with the third keystamp 707A. Again the distance between the second thumbnail 703B and the third keystamp 707A is inversely proportional to the likelihood of the character shown in the second thumbnail 703B being located in the clip associated with the third keystamp 707A.

A third thumbnail 704B contains the image of a still further character but is the same character as displayed in 704A (albeit a larger thumbnail). It is shown that the third thumbnail 704B is connected to the third keystamp 707A, a fourth keystamp 708A and a fifth keystamp 709. Again the distance between the third thumbnail 704B and the third keystamp 707A, fourth keystamp 708A and fifth keystamp 709 is inversely proportional to the likelihood of the character shown in the third thumbnail 704B being located in the clip associated with the third keystamp 707A, fourth keystamp 708A and fifth keystamp 709 respectively.

Additionally, located behind the third keystamp 707A (which is a representation of the video clip) are two further keystamps 707B and 707C. These two further keystamps 707B and 707C are keystamps representing two further takes of the clip. The third keystamp 707A is therefore partially overlaid onto the two further keystamps. Together, the third keystamps 707A and the two further keystamps 707B and 707C form a stack of keystamps. The keystamps within the stack are partially overlaid over one another so that the user can quickly identify the number of takes captured for a particular clip. The order of the keystamps within the stack may be dependent on the number of the respective take. For example, the first take may be located at the bottom of the stack with the last take being located at the top of the stack. This allows the user to see most prominently, the latest take which is most likely the best take. Other mechanisms for determining the take include using the Global Position information, the timecode of the frame, the alignment to the script, burst mode metadata, shot grouping information or the like.

In embodiments, the ordering of the takes can be made in dependence of good shot marker metadata captured from the camera 110. In this instance, if a clip has a good shot marker associated therewith, this take may be placed on top of the clip stack. Indeed, any other ordering of takes in dependence on the metadata (either captured in the camera or extracted by the metadata processor is envisaged).

A similar arrangement to that for the third keystamp 707A is shown for the fourth keystamp 708A. Although a stack of two and three takes is shown, the disclosure is not so limited and any number of takes may exist in a clip stack.

Figure 7C:
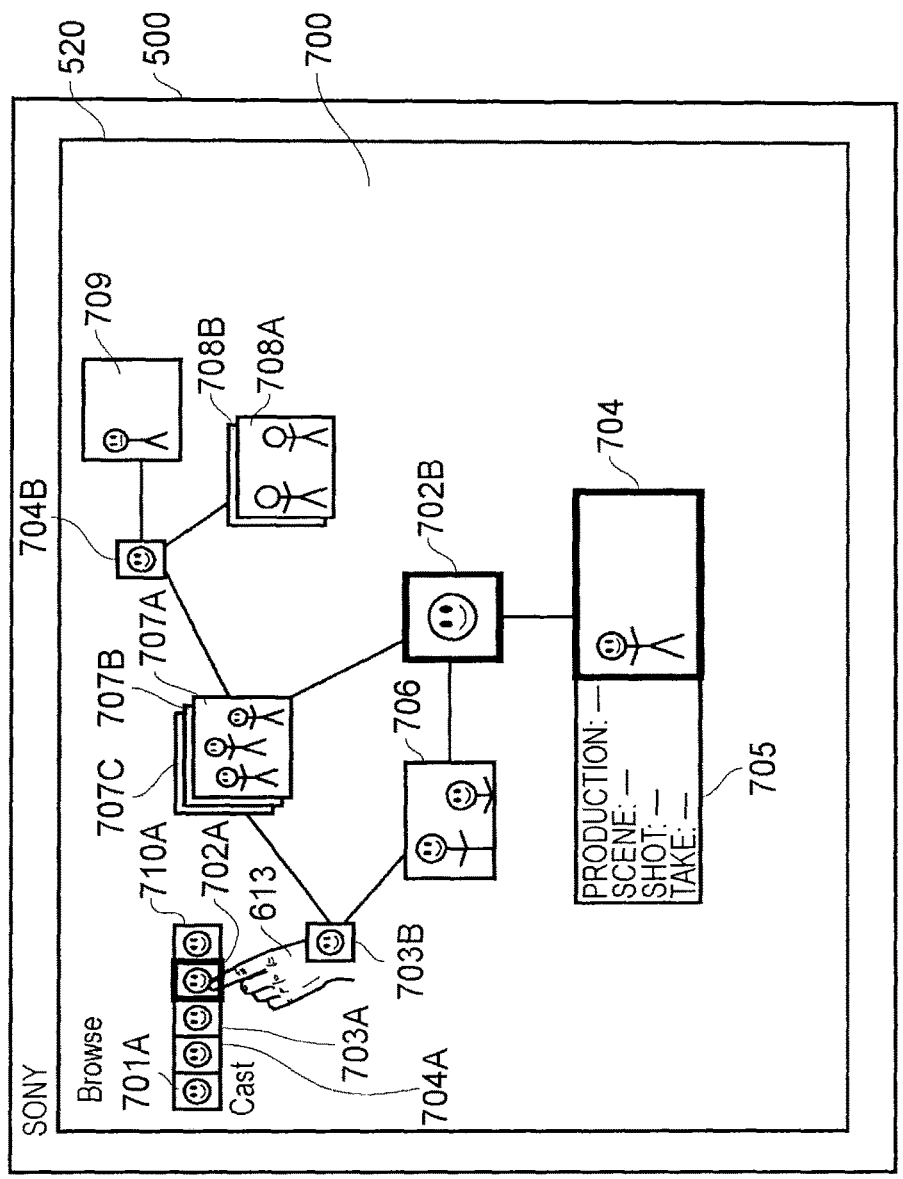
FIG. 7C shows a tablet having a search results map screen loaded thereon, whereby a character is subjected to a long-press.

The disclosure of FIG. 7B shows the situation when a user 613 selects a single character so that the thumbnail containing an image of the character is located at the centre of the display. In other words, the selected object is a single character. FIG. 7C shows the situation where the object selection is based on a combination of two objects which in this context are characters.

Referring to FIG. 7C, the user 613 performs a so called "long press" on thumbnail 702A. In particular, a long press in this context is defined as selecting and maintaining a contact with a particular thumbnail for greater then a predetermined period such as 0.5 seconds. Obviously, other predetermined periods are envisaged.

When the user passes the threshold period so that a long press is defined, a second version (not shown) of the thumbnail 702 is produced. This second version is more transparent than the original thumbnail 702A but indicates to the user that a long press has been activated. The second version is in addition to the presence of the original thumbnail 702A.

Figure 7D:
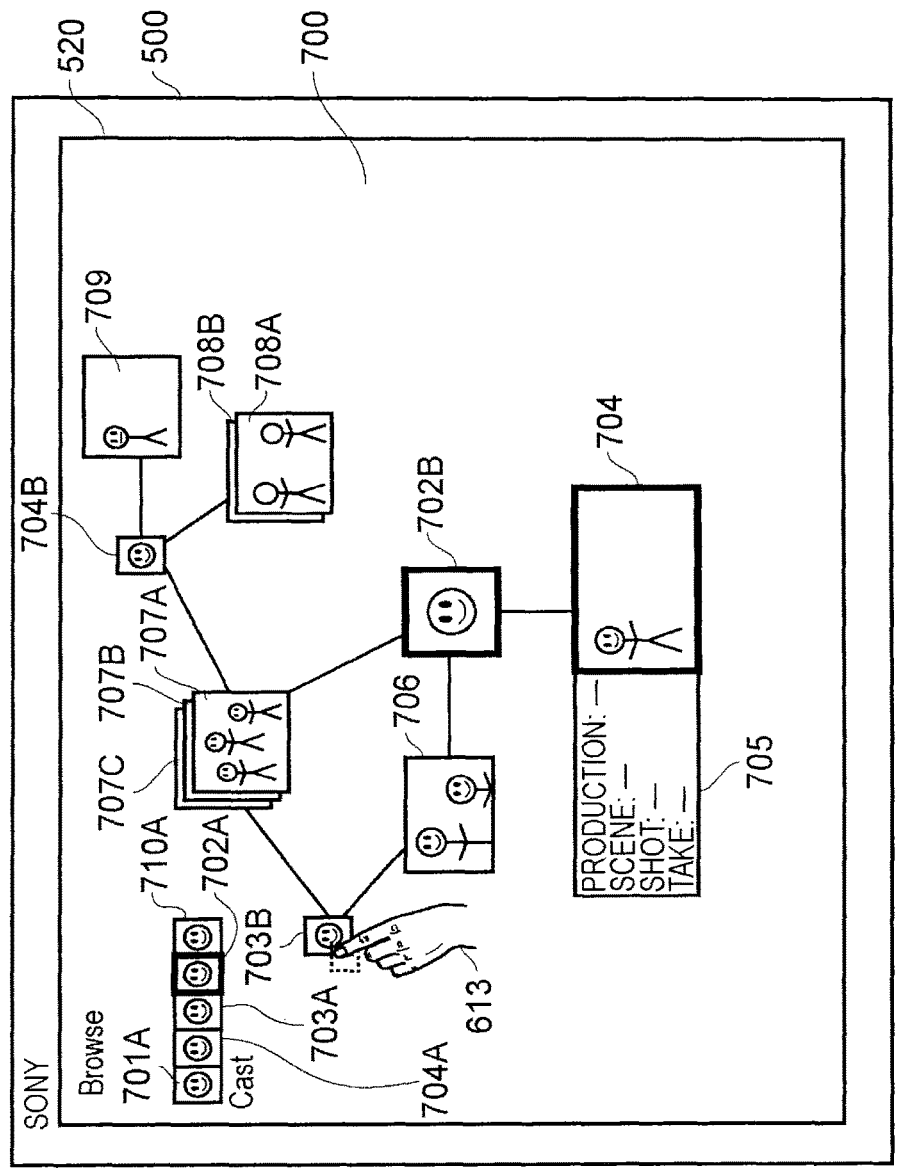
FIG. 7D shows a tablet having a search results map screen loaded thereon, whereby the character subjected to a long press is dragged over a second character image.

Referring now to FIG. 7D, the user maintains contact with the screen and drags the second version of thumbnail 702A across the screen whilst maintaining contact therewith. The user positions the second version over another thumbnail on the screen. In this case, the user positions the second version of the thumbnail 702A over second thumbnail 703B and breaks contact with the screen. The tablet then defines the object selection as providing content that includes the character shown in thumbnail 702A and the character shown in second thumbnail 703B. Of course, although the above describes the thumbnail 702A being positioned over the second thumbnail 703B, it is possible that the larger thumbnails (such as 702B, 703B, 704B) may be positioned over smaller thumbnail images or over other larger thumbnail images.

The selected object (i.e. the request for clips having both the character from thumbnail 702A and the second thumbnail 703B) is then sent from the tablet to the server 400 where the metadata associated with the video clips is analysed by the metadata processor 440. The metadata 440 identifies the video clips with both the character shown in thumbnail 702B and the character shown in second thumbnail 703B and generates a new search result based upon this combination.

Specifically, the server 400 generates the search result screen 700 having the combination of the characters in thumbnail 702B and second thumbnail 703B being located at the centre of the display of the tablet 500. The metadata processor 440 then returns the screen position of each of the video clips containing both the characters from thumbnail 702B and second thumbnail 703B. As before, the distance from the combination of thumbnail 702B and second thumbnail 703B and each of the representative keystamps of the clips is then inversely proportional to the confidence score given to the presence of both characters in the clip.

Figure 7E:
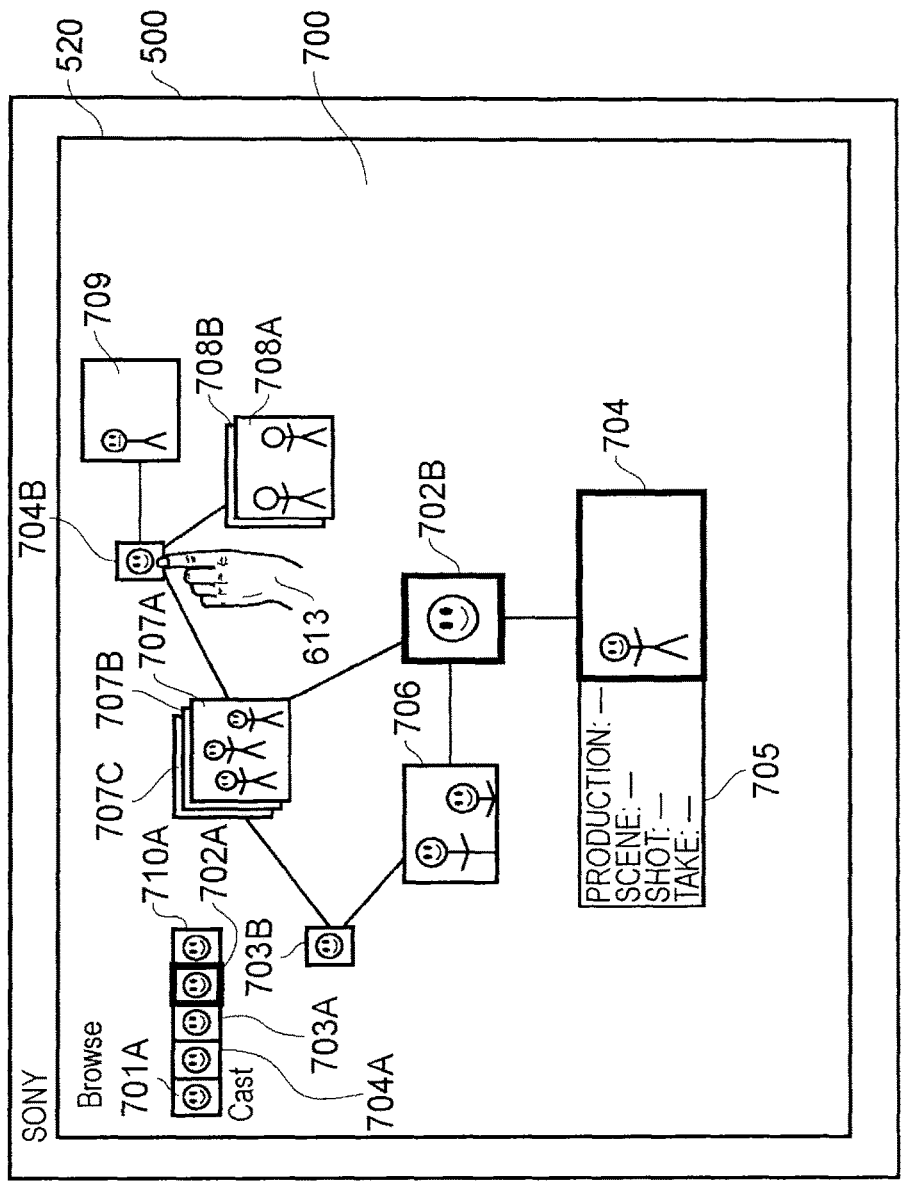
FIG. 7E shows a tablet having a search results map screen loaded thereon, whereby a different character image is selected.

Referring to FIG. 7E, if the user of the tablet simply selects a thumbnail having a different character (in this case third thumbnail 704B) then the selected object output from the tablet 500 is defined as the character present in third thumbnail 704B. This selected object is output from the tablet to the server 400 where the metadata processor 440 analyses the captured content and, from the metadata, establishes the clips in which the character defined in the third thumbnail 704B is located. The metadata processor 440 then places the thumbnail 704B at the centre of the display and the metadata processor returns the map coordinates indicating where on the display the keystamps and thumbnails should be placed as well as the content of the thumbnail and the keystamps as appropriate.

If the user then selects one of the keystamps, the content of the clip will be played back to the user.

Figure 8A:
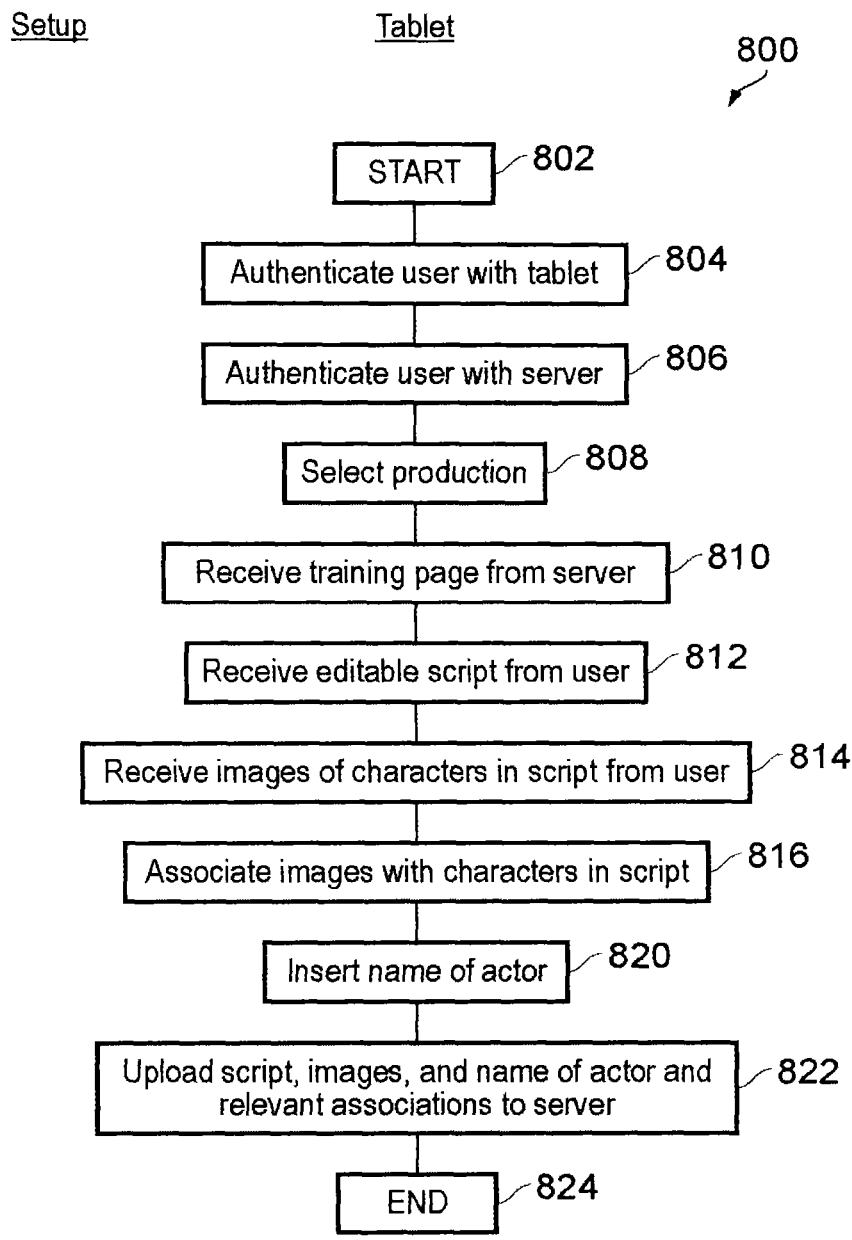
FIG. 8A shows a flow chart describing the setup of the tablet.

Referring to FIG. 8A, a flowchart explaining the setup procedure on the tablet 500 is explained. The flowchart 800 starts at start block 802. Before using the tablet 500, the user must authenticate with the tablet 500. The user may do this by entering a user name and password as would be appreciated by the skilled person. This process is carried out in step 804. After authentication with the tablet 500, the user must also authenticate with the server 400. This is done in step 806 and is also realised by entering a username and password.

Once the user is authenticated with the server 400, a list of productions to which the user has access is sent to the tablet. This is done in step 808. The user selects the appropriate production on the tablet 500 and the selection is passed back to the server. The server 400 then establishes a training page (which is a template stored on the server 400). The training page is sent through to the tablet 500. The tablet receives this training page from server in step 810.

The user then uploads the editable script onto the tablet 500 in step 812. Specifically, the script may be provided by a USB device or may be retrieved from some other storage. Additionally, the images of the characters identified in the script are also provided to the tablet 500. Again, these images may be provided by a USB drive or from content stored elsewhere on the network. This is step 814.

The user then associates the images of each of the characters identified in the script. These images are the long shot and the face shot described with reference to FIG. 6. This is step 816 in flowchart 800.

The user then inserts the name of the actor playing each of the characters in column 570. This is step 820 in the flowchart. Finally, the tablet associates the characters with the relevant parts of the script and also the images of the characters in the script and uploads the script, the images and the name of the actor and all of the relevant associations to the server in step 822. The process then ends in step 824.

Figure 8B:
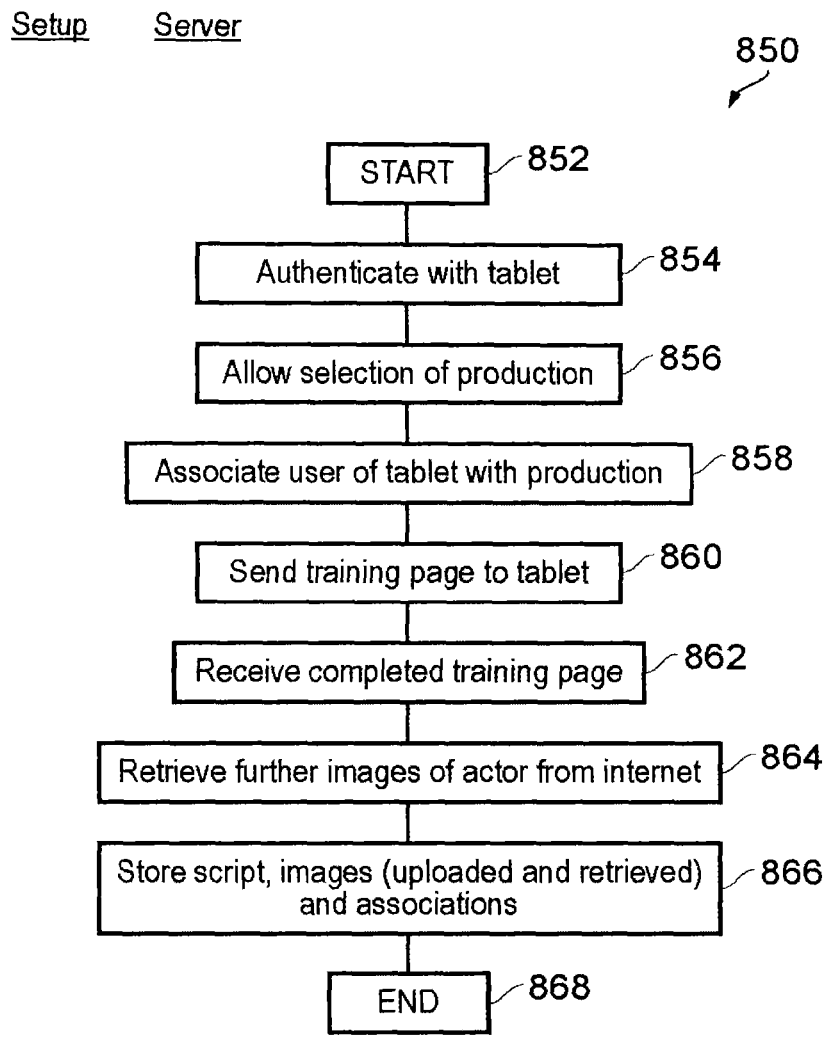
FIG. 8B shows a flow chart describing the setup of the server.

The set up procedure within the server 400 is then described in FIG. 8B. This procedure is shown as flowchart 850.

The process starts at step 852. The server authenticates the user of the tablet in step 854. The server 400 then sends the productions to which the user has access to the tablet 500 in step 856. The user of the tablet 500 then selects the production appropriately and this selection is returned to the server 400. The server 400 then associates the user of the tablet with the specific production and stores this information in association with the actual production in the server storage 425. This is performed in step 858.

The server 400 retrieves the training page template from the server storage 425 and sends the training page template to the tablet 500. This is performed in step 860. After the user has completed the training page, the server 400 receives the completed training page from the tablet 500. This is step 862.

The server 400 retrieves the actor's name from the information sent in the training page. The server performs a web search on the actor's name and retrieves further images of the actor from the internet. This is step 864. The retrieved images are then stored in association with the actor's name and the character images already uploaded from the tablet and stored on the storage device 425. This is step 864 in the flowchart 800.

The server stores the script, images (which comprise both the uploaded images from the tablet 500 and the retrieved images from step 864) and all the associations in step 866. This information is stored on the storage device 425. The process then ends in step 868.

Figure 9A:
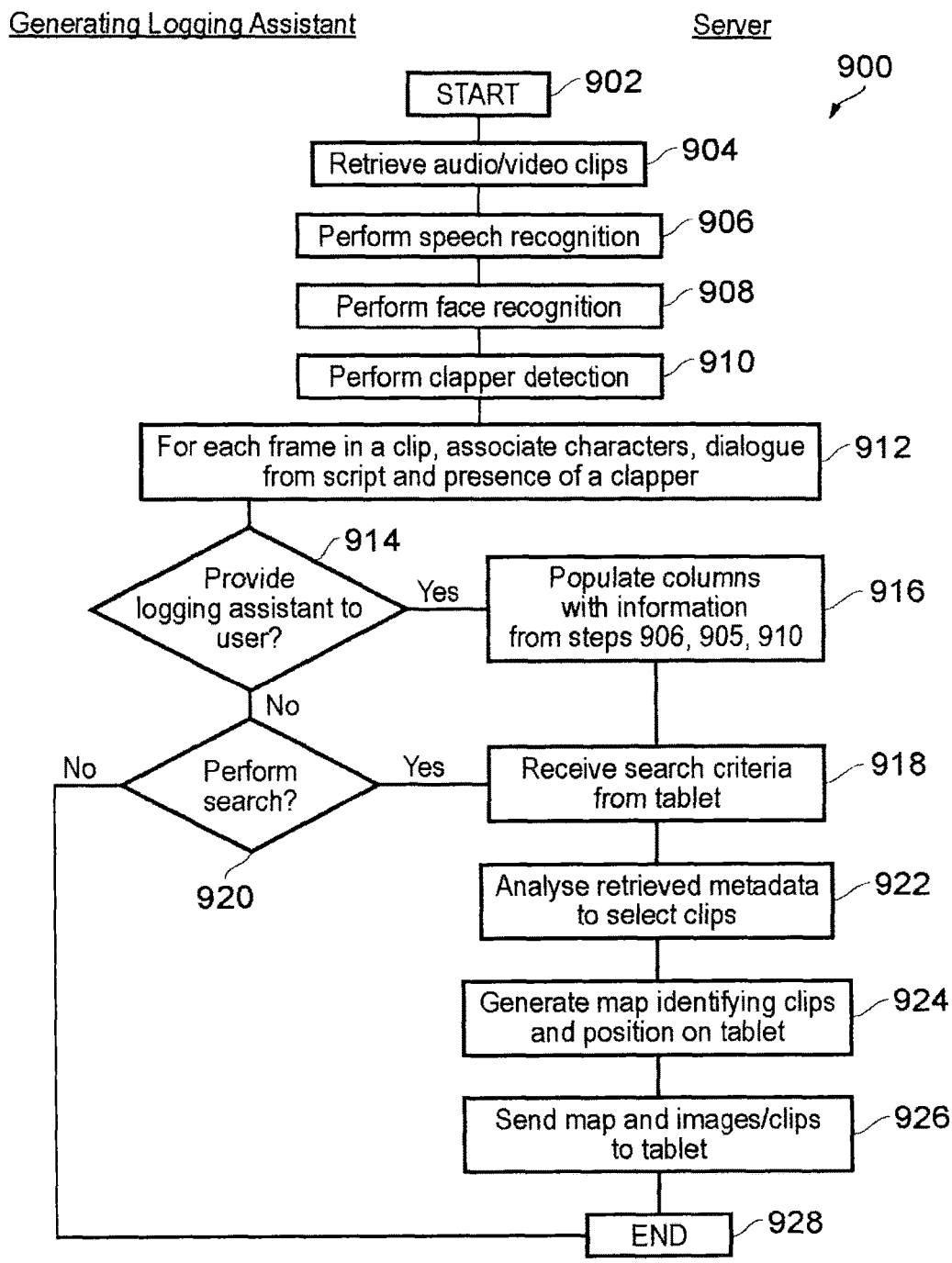
FIG. 9A shows a flow chart describing the generation of the logging assistant at the server.

Referring to FIG. 9A, the process performed by the server in generating the logging assistance is described in flowchart 900. The process starts at step 902. The audio and video clips captured by the camera 110 are retrieved in step 904. The metadata extractor performs speech recognition on the audio clips in step 906. The metadata extractor performs face recognition on the video clips using the character image uploaded by the tablet and the retrieved images from the internet. This is performed at step 908. Finally, clapper detection is performed in step 910. The detected characters, dialogue from script and presence of a clapper are associated with each frame in a particular clip and this information is provided to the metadata processor 440 and stored in server storage 425.

A decision 914 is made as whether or not to provide the logging assistant to the user. The logging assistant is embodied in FIG. 6. If the user requires the logging assistant, the user indicates this in response to the request from the server 400 and the "yes" path is followed. The server 400 populates the columns with the information detected in the speech recognition, face recognition and clapper detection steps. This is step 916. If, on the other hand, the user does not wish for the logging assistant to be provided, the "no" path from step 914 is followed. The user is asked if they wish to perform a search on the captured clips in step 920. If the user does not wish to perform a search on the clips, the "no" path is followed and the procedure ends at step 928. On the other hand, if the user does wish to perform a search, the "yes" path is followed and the user enters the search criteria in step 918 which is then received by the server. It should be also noted here that step 918 follows from step 916 described above.

The server 400 analyses the retrieved metadata from steps 906, 908, 910 to select the clips and position the clips in accordance with the object selected by the tablet 500 and received therefrom in step 918. This analysis takes place in step 922.

The search map or results of FIG. 7B is then generated in step 924. In particular, the map is generated that identifies the clips from the storage medium 425 and the relevant position on the tablet screen 500 that is required. In other words, the server 400 sends a list of coordinates identifying the position of each relevant clip and either a copy of the clip or a link to the clip or a link or copy of a representative keystamp from that clip. The tablet may then generate the map results locally. Alternatively, the server 400 may send the search map 700 in its entirety.

The map and the images and the clips are sent to the tablet in step 926. The process then ends in step 928.

Figure 9B:
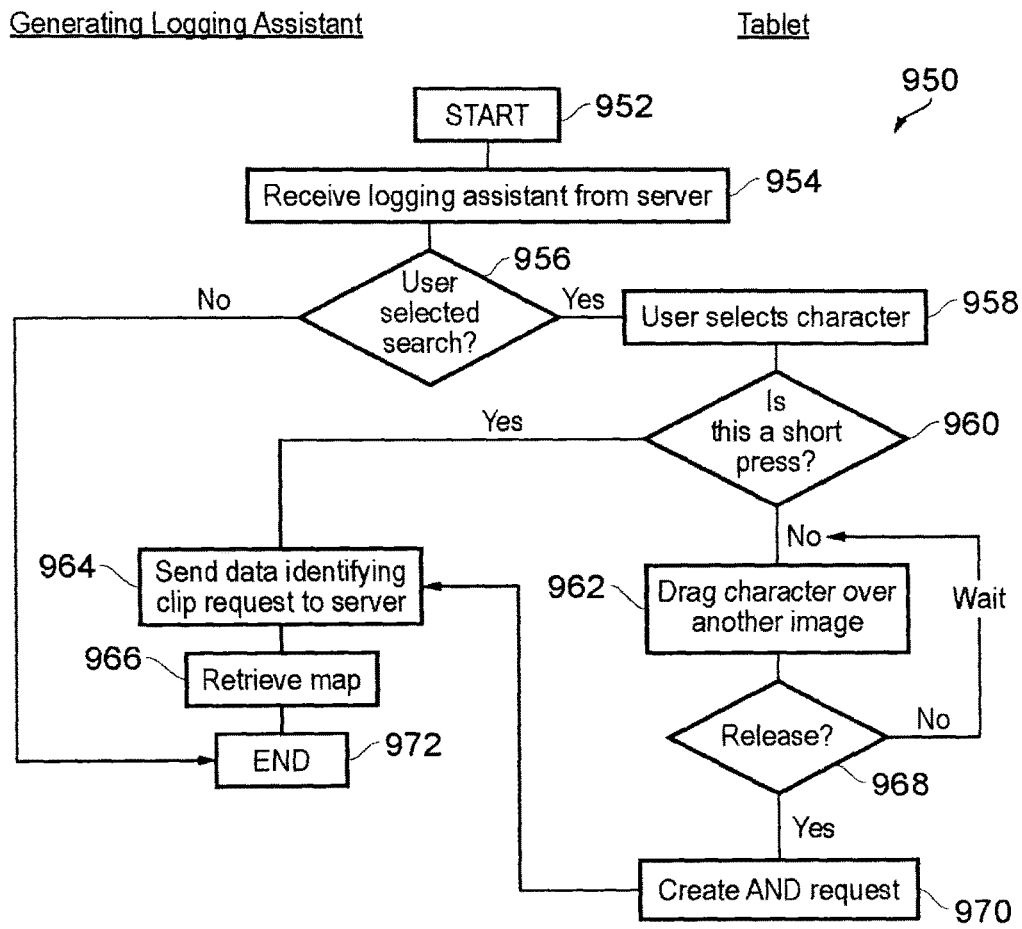
FIG. 9B shows a flow chart describing the generation of the logging assistant at the tablet.

The generation of the logging assistant in the tablet 500 is now described in FIG. 9b. This is described with reference to flowchart 950.

The process starts in 952. The logging assistant template is retrieved from server 400 in step 954. This is done in response to a user request. The user then decides whether they wish for a search to be conducted at step 956. If the user does decide to perform a search, the "yes" path is followed. The user then selects a character displayed in the "cast" area of screen 700. This is step 958. The user may select the character using either a short press, or a long press. The short press is defined as maintaining contact with the character's image for less than a predefined time. In embodiments, this predefined time is 0.5 seconds although the predefined time may be longer or shorter than this. A long press is defined as maintaining contact with the character's image for longer than the predefined time.

The determination of whether the press was a short press is decided at step 960. If the "no" path is followed (i.e. the user performs a long press), the character's image appears on the screen to dislodge from its position (thus producing the second version of the thumbnail) and the thumbnail is dragged over the screen of the tablet 500. The user may then place the image of the character over an image of a different character in step 962. The tablet 500 then decides whether the user has released the dragged image, or in other words, broken contact with the screen. This is step 968. In this case, if the user has not released the dragged image, the "no" path is followed. However, if the user does release the image, the "yes" path is followed.

If the user does release the dragged image over a second, different, character, the tablet 500 assumes that the user of the tablet 500 wishes to search for clips which include both the character in the dragged image and the character in the image over which the dragged image is overlaid. In other words, by allowing a user to drag one character over another character, a Boolean AND function is carried out.

The process then moves to step 964. In step 964, the tablet 500 sends data identifying the selected object which may be a single character or a plurality of characters. In the event that the user makes a short press in step 960, the tablet 500 will display prominently the thumbnail containing the selected character and the clips containing that selected character. However, if the user performs a long-press and creates the Boolean AND request, the tablet will display prominently clips containing both the character in the dragged image and the character in the image over which the dragged image is overlaid.

The process then moves on to step 966. In step 966, a search map having a form set out in FIG. 7B is produced by server 400. This search map is retrieved by the tablet 500 from the server 400. The process ends in step 972.

The foregoing describes in detail the generation of a search map. However, in other embodiments, further use can be made of the captured metadata. These will now be briefly described.

1) The character metadata may be improved by obtaining user feedback. In this case, the user may confirm that a particular clip does contain a character. In this example, when displaying the keystamp adjacent the thumbnail, if the user selects the keystamp with a short press, the tablet 500 may display a feedback button allowing the user to confirm whether or not the character is present in the clip. In dependence of the feedback, the confidence score for that clip can be increased or reduced and the confidence score algorithm may be improved through a process of computer learning using trusted metadata.

2) The user of the tablet 500 may be able to retrieve a copy of the script from the server 400. The user can then select dialogue within the script and the relevant clip can be played back to the user. This is possible because the script is provided in a particular format and the timecodes of the clips are associated with the dialogue in the script. It is also possible that after the clips have been associated with the script, the colour of the script changes colour. That way, it is possible to quickly review the script to ensure that all scenes from the script have been captured and analysed within the server 400. Further, for each area of the script, it is possible to identify the number of takes taken for that area of the script.

3) The user of the tablet 500 may be able to also review the shooting schedule. For example, as noted above, for each clip, there is metadata generated that indicates the content of the clip as well as metadata that is generated by the camera 110. The shooting schedule typically includes metadata such as the camera settings required for a particular scene (such as frame rate, shutter speed, lens type) and planning data for the scene (such as shot categories, frame markers). As this metadata is produced by the metadata sensor 140 in the camera 110, the metadata processor 440 associates the produced metadata with the shooting schedule and updates the shooting schedule accordingly. For example, where required shots have been completed, a coloured border or coloured text may be applied to the shooting schedule. If the user of the tablet 500 requests the shooting schedule from the server 400, therefore, the user can establish very quickly which tasks from the shooting schedule have been completed.

Although the foregoing has been described in relation to a professional production, the disclosure is no way limited to this. For example, the user could capture content using the built in camera within the tablet 500 and upload this content to the server 400. The server 400 then could apply image processing to the image. For example, red-eye reduction could be applied, or an image altering process could be applied such as making the image sepia or the like. The user could then search for photographs having friends or relatives in (as opposed to characters in a production). The photographs could then be returned from the server 400 and displayed on the tablet 500.

Although the foregoing describes the server 400 as providing the co-ordinates for positioning clips of video on the screen of the tablet 500, the disclosure is not so limited. For example, it is envisaged that the server 400 passes back the data describing the clips, actors etc, and their relationships and associated confidence values to the tablet 500. The application running on the tablet 500 application will then determine where to position the clips on the screen. In other words, some of the processing such as determining relationships between clips and actors etc is performed on the server 400 and some of the processing such as optimally laying out the clips, actors etc and connectors between them is performed on the tablet 500.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present disclosure may be generally described as in the following numbered paragraphs.

1. A method of producing the results of a search for content for display on a client comprising: identifying a plurality of objects of interest; uploading an image of each of the plurality of objects to a server; uploading captured content to the server, the captured content including the plurality of objects; performing, on the server, recognition of each of the objects in the captured content; generating a confidence score indicating the probability of each of the recognised objects being present in the content; receiving, from the client, an object selection, wherein the results of the search are arranged on the basis of the selected object; and generating the results of the search on the server for downloading to the client for display on the client, wherein a representation of the captured content is located between a representation of the selected object and another of the plurality of objects, the distance between the representation of the captured content and the plurality of objects being determined in accordance with the confidence score.

2. A method according to paragraph 1, further wherein the position of the selected object is substantially at the centre of the screen of the client.

3. A method according to paragraph 1 or 2, wherein the captured content includes a plurality of takes of the content, and the method comprises: indicating in the representation of the captured content, the number of takes.

4. A method according to paragraph 3, wherein the indication of the number of takes comprises providing a representation of each take in an overlapping manner.

5. A method according to paragraph 1 to 4, wherein the distance between the representation of the captured content and the representation of the plurality of objects is inversely proportional to the confidence score.

6. A method according to paragraph 1 to 5, comprising providing metadata indicating the focal length of the camera capturing the content and determining the category of the captured content in dependence of the metadata.

7. A method according to paragraph 1 to 6, wherein the object selection on the tablet comprises: receiving a long-press from a user highlighting one of the plurality of objects; receiving a dragging operation from the user, dragging said highlighted object; and receiving a release operation from the user over a second one of the plurality of objects, wherein the object selection comprises selecting content including both the highlighted object and the second one of the plurality of objects.

8. A computer program containing computer readable instructions, which, when loaded onto a computer, configure the computer to perform a method according to any one of paragraph 1 to 7.

9. A computer program product configured to store a computer program of paragraph 8 therein or thereon.

10. A system for producing the results of a search for content, the system comprising a server and a client, wherein the client comprises a user input operable to identify a plurality of objects of interest displayed on the client; a communications unit operable to upload an image of each of the plurality of objects to the server, and the server comprises a server communications unit operable to receive captured content, the captured content including the plurality of objects, a processing unit operable to recognise each of the objects in the captured content and to generate a confidence score indicating the probability of each of the recognised objects being present in the content, wherein the server communication unit is operable to receive, from the client, an object selection, wherein the results of the search are arranged on the basis of the selected object; and the processing unit is operable to generate the results of the search for downloading to the client for display on a display of the client, wherein a representation of the captured content is located between a representation of the selected object and another of the plurality of objects, the distance between the representation of the captured content and the plurality of objects being determined in accordance with the confidence score.

11. A system according to paragraph 10, further wherein the position of the selected object is substantially at the centre of the screen of the client.

12. A system according to paragraph 10 or 11, wherein the captured content includes a plurality of takes of the content, and the display of the client is operable to display an indication in the representation of the captured content, the number of takes.

13. A system according to paragraph 12, wherein the indication of the number of takes comprises providing a representation of each take in an overlapping manner.

14. A system according to paragraph 10 to 13, wherein the distance between the representation of the captured content and the representation of the plurality of objects is inversely proportional to the confidence score.

15. A system according to paragraph 10 to 13, wherein the server communications unit is operable to receive metadata indicating the focal length of the camera capturing the content and the processing unit is operable to determine the category of the captured content in dependence of the metadata.

16. A system according to paragraph 10 to 13, wherein the user interface on the client includes a touch screen and the touch screen is operable to receive a long-press from a user highlighting one of the plurality of objects; receive a dragging operation from the user, drag said highlighted object; and receive a release operation from the user over a second one of the plurality of objects, wherein the client is operable to select content including both the highlighted object and the second one of the plurality of objects.

17. A server for producing the results of a search for content, the server comprising a server and a client, wherein the client comprises a user input operable to identify a plurality of objects of interest displayed on the client; a communications unit operable to upload an image of each of the plurality of objects to the server, and the server comprises a server communications unit operable to receive a plurality of objects of interest to a user of a client, and to receive an image of each of the plurality of the objects and captured content, the captured content including the plurality of objects, a processing unit operable to recognise each of the objects in the captured content and to generate a confidence score indicating the probability of each of the recognised objects being present in the content, wherein the server communication unit is operable to receive, from the client, an object selection, wherein the results of the search are arranged on the basis of the selected object; and the processing unit is operable to generate the results of the search for downloading to the client for display on a display of the client, wherein a representation of the captured content is located between a representation of the selected object and another of the plurality of objects, the distance between the representation of the captured content and the plurality of objects being determined in accordance with the confidence score.

18. A server according to paragraph 17, further wherein the position of the selected object is substantially at the centre of the screen of the client.

19. A server according to paragraph 17 or 18, wherein the captured content includes a plurality of takes of the content, and the server is operable to provide to the client an indication in the representation of the captured content, the number of takes.

20. A server according to paragraph 19, wherein the indication of the number of takes comprises providing a representation of each take in an overlapping manner.

21. A server according to paragraph 17 to 20, wherein the distance between the representation of the captured content and the representation of the plurality of objects is inversely proportional to the confidence score.

22. A server according to paragraph 17 to 21, wherein the server communications unit is operable to receive metadata indicating the focal length of the camera capturing the content and the processing unit is operable to determine the category of the captured content in dependence of the metadata.

23. A client for displaying the results of a search for content, the client comprising a user input operable to identify a plurality of objects of interest displayed on the client; a communications unit operable to upload an image of each of the plurality of objects to a server, and the communications unit is operable to send to the server, an object selection and to receive from the server, for display, the results of the search, wherein a representation of captured content is located between a representation of the selected object and another of the plurality of objects, and the distance between the representation of the captured content and the plurality of objects is determined in accordance with a confidence score that indicates the probability of each of the recognised objects being present in the content.

24. A client according to paragraph 23, further wherein the position of the selected object is substantially at the centre of the screen of the client.

25. A client according to paragraph 23 or 24, wherein the captured content includes a plurality of takes of the content, and the display of the client is operable to display an indication in the representation of the captured content, the number of takes.

26. A client according to paragraph 25, wherein the indication of the number of takes comprises providing a representation of each take in an overlapping manner.

27. A client according to paragraph 23 to 26, wherein the distance between the representation of the captured content and the representation of the plurality of objects is inversely proportional to the confidence score.

28. A client according to paragraph 23 to 27, wherein the user interface on the client includes a touch screen and the touch screen is operable to receive a long-press from a user highlighting one of the plurality of objects; receive a dragging operation from the user, drag said highlighted object; and receive a release operation from the user over a second one of the plurality of objects, wherein the client is operable to select content including both the highlighted object and the second one of the plurality of objects.

The invention claimed is:

1. A method of producing a plurality of relationships between content and objects within the content for display on a client comprising:
   identifying a plurality of objects of interest;
   uploading an image of each of the plurality of objects of interest to a server;
   uploading captured content to the server, the captured content including the plurality of objects of interest, the captured content being discrete from the image of each of the plurality of objects of interest, and the captured content including a plurality of takes of the captured content;
   performing, on the server, recognition of each of the objects of interest in the captured content;
   generating a confidence score indicating a probability of each of the recognized objects being present in the captured content;
   receiving, from the client, an object selection of one of the plurality of objects of interest;
   generating the plurality of relationships on the server for downloading to the client for display on the client on the basis of the selected object of the plurality of objects of interest and the confidence scores; and
   displaying, on the client, the plurality of relationships, wherein
   in the displayed plurality of relationships, a representation of the captured content is located between a representation of the selected object of the plurality of objects of interest and a representation of another of the plurality of objects of interest, the representation of the captured content indicating a number of the plurality of takes of the captured content,
   the representation of the captured content includes therein a second representation of the selected object of the plurality of objects of interest and a second representation of the other of the plurality of objects of interest, and
   distances between the representation of the captured content and the representations of the plurality of objects of interest are determined in accordance with the confidence scores.

2. The method according to claim 1, wherein a position of the selected object of the plurality of objects of interest is substantially at a center of a screen of the client.

3. The method according to claim 1, wherein indicating the number of the plurality of takes of the captured content includes providing a representation of each of the plurality of takes of the captured content in an overlapping manner.

4. The method according to claim 1, wherein the distances between the representation of the captured content and the representations of the plurality of objects of interest is inversely proportional to respective confidence scores.

5. The method according to claim 1, further comprising:
   providing metadata indicating a focal length of a camera capturing the content, and
   determining a category of the captured content based upon the metadata.

6. The method according to claim 1, wherein
   the object selection of the one of the plurality of objects of interest includes:
      receiving a long-press from a user highlighting the one of the plurality of objects of interest;
      receiving a dragging operation from the user; and
      receiving a release operation from the user over the other of the plurality of objects of interest.

7. A non-transitory computer readable medium including computer program instructions, which when executed by a computer cause the computer to perform the method of claim 1.

8. The method of claim 1, wherein
   in the displayed plurality of relationships, a second representation of the captured content, different from the representation of the captured content, is located between the representation of the other of the plurality of objects of interest and representation of a third object of the plurality of objects of interest, and
   the second representation of the captured content includes a third representation of the other of the plurality of objects of interest and a second representation of the third object of the plurality of objects of interest.

9. The method of claim 1, wherein, in the displayed plurality of relationships, the representation of the selected object of the plurality of objects of interest is visually linked to the second representation of the captured content.

10. The method of claim 1, wherein, in the displayed plurality of relationships, a second representation of the captured content containing a third representation of the selected object of the plurality of objects of interest is visually linked to the representation of the selected object of the plurality of objects of interest.

11. The method of claim 10, wherein, in the displayed plurality of relationships, at least one of a production value representing a production to which the captured content corresponding to the second representation of the captured content belongs, a scene value representing a scene to which the captured content corresponding to the second representation of the captured content belongs, a shot value representing a shot to which the captured content corresponding to the second representation of the captured content belongs, and a take value representing a take to which the captured content corresponding to the second representation of the captured content belongs is displayed proximate to the second representation of the captured content.

12. A system for producing a plurality of relationships between content and objects within the content, the system comprising:
a server, and
a client, wherein
the client includes:
  a user input operable to identify a plurality of objects of interest displayed on the client;
  a communications unit operable to upload an image of each of the plurality of objects of interest to the server; and
  a display unit operable to display the plurality of relationships, and
the server includes:
  a server communications unit operable to receive captured content, the captured content including the plurality of objects of interest, the captured content being discrete from the image of each of the plurality of objects of interest, and the captured content including a plurality of takes of the captured content; and
  a processing unit operable to recognize each of the objects of interest in the captured content and to generate a confidence score indicating a probability of each of the recognized objects being present in the captured content,
the server communication unit is operable to receive, from the client, an object selection of one of the plurality of objects of interest,
the processing unit is operable to generate the plurality of relationships for downloading to the client for display on the display unit of the client on the basis of the selected object of the plurality of objects of interest and the confidence scores,
in displaying the plurality of relationships, the display unit displays a representation of the captured content located between a representation of the selected object of the plurality of objects of interest and a representation of another of the plurality of objects of interest, the representation of the captured content indicating a number of the plurality of takes of the captured content,
the representation of the captured content includes therein a second representation of the selected object of the plurality of objects of interest and a second representation of the other of the plurality of objects of interest, and
distances between the representation of the captured content and the representations of the plurality of objects of interest are determined in accordance with the confidence scores.

13. The system according to claim 12, further wherein a position of the selected object of the plurality of objects of interest is substantially at a center of a screen of the client.

14. The system according to claim 12, wherein the indication of the number of the plurality of takes of the captured content includes providing a representation of each of the plurality of takes of the captured content in an overlapping manner.

15. The system according to claim 12, wherein the distances between the representation of the captured content and the representations of the plurality of objects of interest is inversely proportional to respective confidence scores.

16. The system according to claim 12, wherein
the server communications unit is operable to receive metadata indicating a focal length of a camera capturing the content, and
the processing unit is operable to determine a category of the captured content based upon the metadata.

17. The system according to claim 12, wherein
the user input includes a touch screen,
the touch screen is operable to:
  receive a long-press from a user highlighting the one of the plurality of objects of interest;
  receive a dragging operation from the user; and
  receive a release operation from the user over the other of the plurality of objects of interest.

18. A client for displaying a plurality of relationships between content and objects within the content, the client comprising:
a user input circuitry operable to identify a plurality of objects of interest displayed on the client;
a communications unit circuitry operable to:
  upload an image of each of the plurality of objects of interest to a server,
  send to the server, an object selection of one of the plurality of objects of interest, and
  receive from the server the plurality of relationships; and
a display circuitry operable to display the plurality of relationships, wherein
in displaying the plurality of relationships, the display circuitry displays a representation of captured content located between a representation of the selected object of the plurality of objects of interest and a representation of another of the plurality of objects of interest, the representation of the captured content indicating a number of a plurality of takes of the captured content,
the representation of the captured content includes therein a second representation of the selected object of the plurality of objects of interest and a second representation of the other of the plurality of objects of interest, and
distances between the representation of the captured content and the representations of the plurality of objects of interest are determined in accordance with a confidence score that indicates a probability of each of the recognized objects being present in the captured content.

19. The client according to claim 18, wherein a position of the selected object of the plurality of objects of interest is substantially at a center of a screen of the client.

20. The client according to claim 18, wherein indicating the number of the plurality of takes of the captured content includes providing a representation of each of the plurality of takes of the captured content in an overlapping manner.

21. The client according to claim 18, wherein the distances between the representation of the captured content and the representations of the plurality of objects of interest is inversely proportional to respective confidence scores.

* * * * *